United States Patent
Niwa et al.

(10) Patent No.: US 7,555,385 B2
(45) Date of Patent: Jun. 30, 2009

(54) APPARATUS FOR PREDICTING ROAD SHAPE

(75) Inventors: Toshiaki Niwa, Okazaki (JP); Toshihiro Shiimado, Okazaki (JP)

(73) Assignee: Aisin AW Co., Ltd. (JP)

( * ) Notice: Subject to any disclaimer, the term of this patent is extended or adjusted under 35 U.S.C. 154(b) by 531 days.

(21) Appl. No.: 11/033,446

(22) Filed: Jan. 12, 2005

(65) Prior Publication Data
US 2005/0187705 A1 Aug. 25, 2005

(30) Foreign Application Priority Data
Jan. 30, 2004 (JP) ............... 2004-023166

(51) Int. Cl.
*G01C 21/30* (2006.01)
(52) U.S. Cl. ...................... 701/208; 701/200
(58) Field of Classification Search ............... 701/200, 701/23–25, 208, 210, 72; 73/178 R
See application file for complete search history.

(56) References Cited

U.S. PATENT DOCUMENTS
6,738,705 B2 * 5/2004 Kojima et al. ............. 701/96

FOREIGN PATENT DOCUMENTS
| DE | 199 40 007 A1 | 8/1999 |
| EP | 1 593 936 A2 | 11/2005 |
| JP | 11160078 | 6/1999 |
| JP | 2001-093094 | 4/2001 |
| JP | 2001-093094 | 6/2001 |

OTHER PUBLICATIONS

Schwartz D.A.; Clothold Road Geometry Unsuitable for Sensor Fusion Clothold Parameter Sloshing; Intelligent Vehicles Symposium, 2003, pp. 484-488.
* cited by examiner

*Primary Examiner*—Yonel Beaulieu
(74) *Attorney, Agent, or Firm*—Bacon & Thomas, PLLC

(57) ABSTRACT

An apparatus for predicting road shape includes a map data reading unit, a clothoid curve calculating unit for calculating a clothoid curve corresponding to a corner area, and a fitting unit for adjusting the clothoid curve to the corner area. The clothoid curve calculating unit calculates a clothoid curve by using X-coordinates and Y-coordinates which are found by expressions:

$$x = X_0 + \sum_L \cos\phi \qquad (1)$$

and $$y = Y_0 + \sum_L \cdot \sin\phi, \qquad (2)$$

wherein $X_0$ and $Y_0$ are coordinates at a start point of a clothoid curve, L is distance from the start point of the clothoid curve, $\phi$ is computed by equation (3) $\phi = \alpha + 2kL$, wherein $\alpha$ is an angle for the start point of the clothoid curve and "k" is computed by equation (4) $k = 28/A^2$, wherein A is a clothoid coefficient.

11 Claims, 22 Drawing Sheets

RADIUS-CLOTHOID COEFFICIENT TABLE

| RADIUS | (CLOTHOID COEFFICIENT)$^2$ |
|---|---|
| 10 | 498 |
| 20 | 732 |
| ⋮ | ⋮ |
| 340 | 11060 |
| 350 | 11088 |

APPARATUS FOR PREDICTING ROAD SHAPE

CROSS-REFERENCE TO RELATED APPLICATIONS

The disclosure of Japanese Patent Application No. 2004-023166 filed on Jan. 30, 2004 including the specification, drawings and abstract is expressly incorporated herein by reference in its entirety.

BACKGROUND OF THE INVENTION

This invention relates to an apparatus for determining road shape.

Conventional navigation apparatus in a vehicle such as a car uses a position detecting unit such as GPS (Global Positioning System) or various kinds of sensors to detect a current position of the vehicle. The navigation apparatus searches and displays a route from the current position to a destination point for use by a driver of the vehicle.

Often vehicles in which the navigation apparatus is installed include a power train control apparatus for controlling the vehicle driving force based upon road status data provided by the navigation apparatus. For example, if navigation data indicates that the vehicle is entering a corner (curve) and that vehicle operating conditions exceed preset conditions, the power control executes a corner control procedure such as slowing the vehicle and possibly shifting down to a lower shift gear level from a higher gear level. During a down shift the power control operates the transmission to change a small transmission ratio to a larger transmission ratio.

In determining the need for controlling the vehicle driving force, the control apparatus executes a calculation procedure based on various kinds of data such as road status data, vehicle speed, accelerator opening and the like which are provided from the navigation system. Based upon these calculations, control data are created to control the vehicle for various corresponding detected road status conditions (refer to, for example, Japanese Unexamined Patent Application Publication No. 2001-93094).

A database of stored map data in the navigation apparatus contains node point data which indicate positions and shapes of roads. The density or closeness of successive node points is used to determine the radius of curvature of a road, i.e., curves with a small radius of curvature are indicated by closely spaced node points (high density) while curves of larger radius are indicated by more distantly spaced node points (low density). However, often the node points at sharp bends or corners of roads, such as at corner entrances, are set at a low density so that the shape of a curve determined by density of node points may be different from an actual road shape.

Where node points such as in corner entrances are set only in low density, the curvature and the start and end points of the corner can not be determined based upon the density of the node points. Thus, it is not possible to execute an appropriate corner control at such corners.

BRIEF SUMMARY OF THE INVENTION

Accordingly, it is beneficial to provide an apparatus for predicting road shape that calculates clothoid curves based on node point information stored in a database and accurately predicts road shape including corners.

Various exemplary implementations provide an apparatus for predicting road shape comprising a map data reading unit for reading map data, a clothoid curve calculating unit for calculating a clothoid curve corresponding to a corner area based on the map data, and a fitting unit for adjusting the clothoid curve to the corner area.

Various exemplary implementations provide another apparatus for predicting road shape including a start point position detecting unit for detecting a position of a start point or end point of the corner area based on the clothoid curve adjusted to the corner area.

Various exemplary implementations provide another apparatus for predicting road shape wherein the fitting unit adjusts the clothoid curve to a start part or end part of the corner area.

Various exemplary implementations provide another apparatus for predicting road shape wherein the clothoid curve calculating unit obtains a clothoid coefficient corresponding to the minimum radius of said corner area from a table which is produced based on a relation between a radius of the corner area on an actual road and a clothoid curve which is used at design of said road.

Various exemplary implementations provide another apparatus for predicting road shape wherein the clothoid curve calculating unit calculates a clothoid curve using X-coordinates and Y-coordinates which are found by the following approximate expressions (1) and (2):

$$X = X_0 + \sum_L \cos \phi \quad (1)$$

$$Y = Y_0 + \sum_L \cos \phi \quad (2)$$

wherein $X_0$ and $Y_0$ are X-Y coordinates at a start point of a clothoid curve and L is a distance from the start point of the clothoid curve. Assuming an angle for the start point of the clothoid curve is $\alpha$, $\phi$ is computed by the following equation (3):

$$\phi = \alpha + 2kL. \quad (3)$$

Assuming a clothoid coefficient is "A", "k" is computed by the following equation (4)

$$k = \frac{28}{A^2}. \quad (4)$$

Further, various exemplary implementations provide another apparatus for predicting road shape including a predicted result database for storing data obtained by each operation of the clothoid curve calculating unit, fitting unit, and start point position detecting unit.

BRIEF DESCRIPTION OF THE DRAWINGS

Exemplary implementations will now be described with reference to the accompanying drawings, wherein.

DETAILED DESCRIPTION OF THE INVENTION

Figure 1:
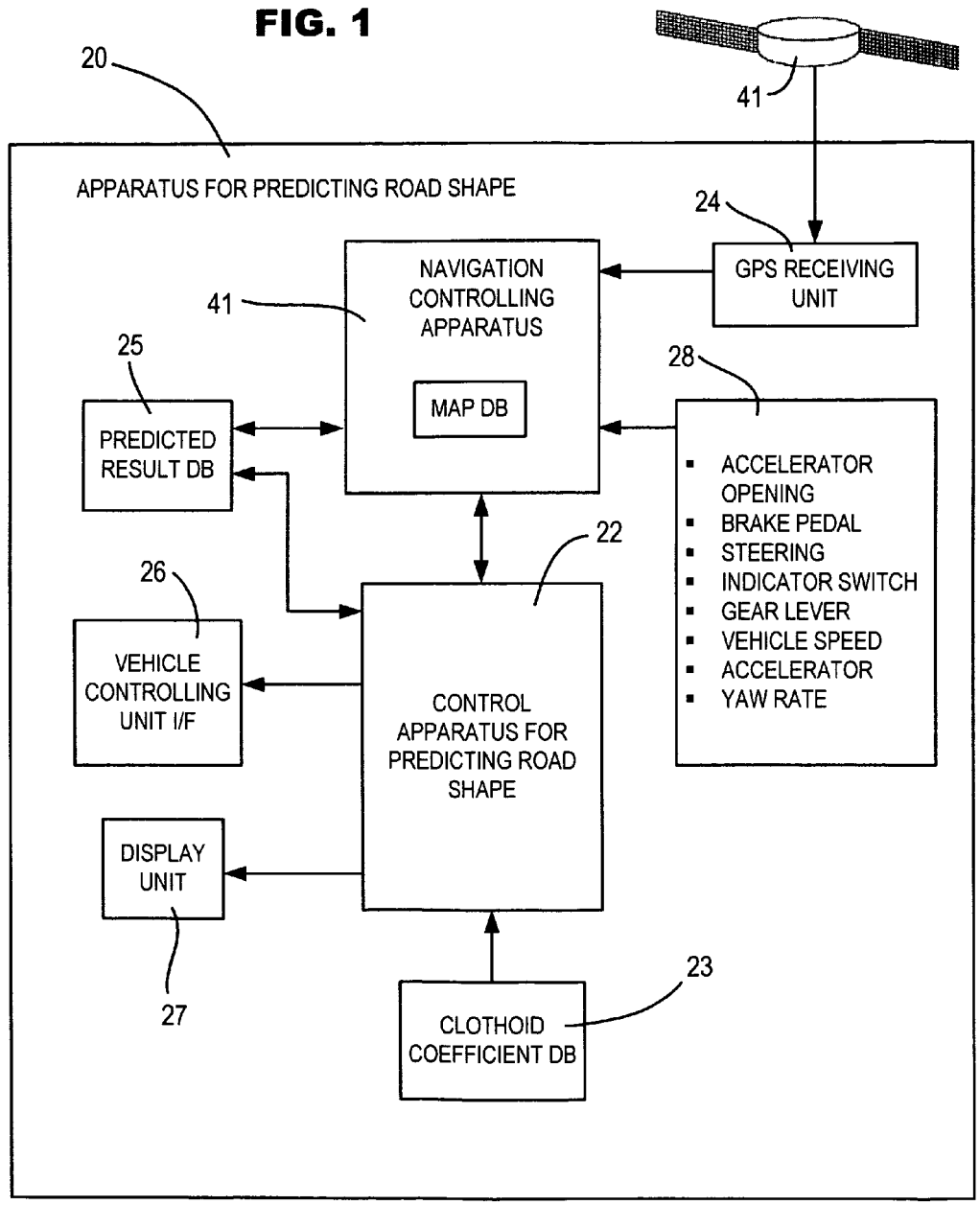
FIG. 1 is a block diagram showing an exemplary structure of the apparatus for predicting road shape.

In an exemplary structure of the apparatus for predicting road shape shown in FIG. 1, reference numeral 20 denotes an apparatus for predicting road shape as a kind of computer system including a storage medium and the like. The apparatus for predicting road shape may be installed on a vehicle such as a passenger car, a truck, a bus, a motorcycle, or a service vehicle. Reference numeral 41 denotes GPS satellites that around the earth and transmit GPS information. There are plural GPS satellites (for example, 24 satellites on 6 orbits) and three or more GPS satellites in sight of the vehicle are required to determine the position of the vehicle.

In the apparatus for predicting road shape 20, reference numeral 21 denotes a navigation control apparatus which executes basic procedure for navigation, for example, map display, current position detection for a vehicle, and route guidance. Reference numeral 22 denotes a control apparatus for predicting road shape including corners. The control apparatus 22 transfers various kinds of information with the navigation control apparatus 21.

Reference numeral 24 denotes a GPS receiving unit that receives GPS information from the GPS satellites 41 and determines the longitudinal and latitudinal position of the vehicle. This positional information is transferred to the navigation control apparatus 21. The structure of the GPS receiving unit may be same as a structure of a common navigation apparatus. Reference numeral 25 denotes a predicted result database for storing road shape data including corners predicted by the control apparatus for predicting road shape 22. Reference numeral 26 denotes an interface for vehicle control apparatus that communicates with the vehicle control apparatus. The vehicle control apparatus may control each section in the vehicle, for example, a vehicle engine controlling unit, a driving force controlling unit to control a transmission ratio, and the like. Further reference numeral 27 denotes a display unit that displays road information such as road shape including corners when receiving an order from the control apparatus for predicting road shape 22. A CRT, a liquid crystal display, an LED (Light Emitting Diode) display, or a hologram device may be used as the display unit. Note that the display unit 27 also may display various kinds of data such as map information, route information, and searched facility information which is output from the navigation control apparatus 21.

Reference numeral 28 denotes a sensor information receiving unit that receives various kinds of vehicle status information from various sensors and transfers the information to the navigation control apparatus 21. Note that the vehicle status information may be transferred to the control apparatus for predicting road shape 22 via the navigation control apparatus 21. In this case, as the sensors, an accelerator opening sensor that detects an accelerator opening, a brake switch that detects motion of a brake pedal operated by a driver, a steering sensor that detects a rudder angle of steering operated by the driver, an indicator sensor that detects motion of an indicator switch operated by the driver, a gear lever sensor that detects motion of a transmission gear lever operated by the driver, a vehicle speed sensor that detects a vehicle driving speed that is called a vehicle speed, an acceleration sensor that detects a vehicle acceleration, and a yaw-rate sensor that detects a yaw rate indicating direction change of the vehicle may be used. As the vehicle status information, an accelerator opening, motion of a brake pedal operated by a driver, a rudder angle of steering operated by the driver, motion of an indicator switch operated by the driver, motion of a transmission gear lever operated by the driver, a vehicle driving speed, that is called a vehicle speed, a vehicle acceleration, and a yaw rate indicating direction change of the vehicle may be included.

Reference numeral 23 denotes a clothoid coefficient database for storing a radius-clothoid coefficient table which is produced by statistically analyzing a relation between radius of road and clothoid coefficient. Based on a road design map, the radius-clothoid coefficient table may be produced by statistically analyzing a relation between radius of road and clothoid coefficient according to corner area in advance.

The navigation control apparatus 21 may include a CPU, MPU (not shown) serving as operation means, a semiconductor memory, a storage medium such as a magnetic disk, and a communication interface. A map database 21a may be stored in the storage medium. The map database 21a may consist of various kinds of map data, for example, an intersection data file, a node data file, a road data file, and a facility information data file including hotels, gas stations in each area. Further, in the storage medium, not only data for searching a route but various kinds of data may be stored such as data to display guidance along with a searched route, data to display a distance to a next intersection, data to display a driving direction at the next intersection, and data to display other guidance information. Further various kinds of data output information such as voice may be stored in the storage medium. External storage mediums and any type of storage mediums can be used, such as a magnetic tape, a magnetic disk, a magnetic drum, a flash memory, a CD-ROM, an MD, a DVD-ROM, an optical disc, an MO, an IC card, an optical card, or a memory card.

In the map database 21a, intersection data is stored in an intersection data file, node data is stored in a node data file, and road data is stored in a road data file. Then a road status based on the intersection data, node data, and road data is displayed on a screen of the display unit 27. The intersection data may include data indicating types of each intersection, that is, data indicating whether traffic lights are installed or no traffic lights are installed. The node data represents at least location and shape of roads of map data stored in the map database 21a, and the node data may include data indicating branch points (including intersections and T junctions), node points, and links between adjacent nodes of actual roads. Note that a bend point of a road is also regarded as a node point.

The road data may include data indicating properties of road itself such as a road width, a cant, a bank, the number of lanes, a point at which the number of lanes decreases, and a point at which the width decreases. In the case of an expressway or a trunk road, a set of lanes in one direction may be stored as road data and another set of lanes in the opposite direction is separately stored as another road data, that is, each expressway or trunk road is treated as a double road. More specifically, a trunk road having two or more lanes in each direction is regarded as a double road, and a set of inbound lanes and a set of outbound lanes may be stored as separate road data. The road data may further include corner data indicating the curvature radius, an intersection, a T-junction, and/or a corner entrance. The road data may further include a road attribute, for example, a railroad crossing, an expressway entrance/exit ramp, a tollgate of an expressway, and types of roads.

Preferably the communication interface of the navigation control apparatus 21 serves to communicate with an FM transmitter, a telephone network, the internet, and a portable telephone network as well as with the control apparatus for predicting road shape 22. For example, it is preferred that various kinds of data, for example, traffic information such as traffic congestion information via an information sensor (not shown), traffic accident information, and D-GPS information indicating the detection error of the GPS sensor can be received.

The navigation control apparatus 21 executes various kinds of processing such as searching a route to a destination, guiding along the route, searching points, facilities, and the like based on information received from the GPS receiving unit 24 and the sensor information receiving unit 28. Then the navigation control apparatus 21 displays a map on the screen of the display unit 27 and further displays a current position of the vehicle, a route from the current position to the destination, guidance information along with each route on the map. Note that the guidance information can be output from a sounding unit by voice.

The control apparatus for predicting road shape 22 may include a CPU, MPU (not shown) serving as operation means, a semiconductor memory, a storage medium such as a magnetic disk, and a communication interface. External storage mediums and any type of storage mediums can be used, such as a magnetic tape, a magnetic disk, a magnetic drum, a flash memory, a CD-ROM, an MD, a DVD-ROM, an optical disc, an MO, an IC card, an optical card, or a memory card.

Further the control apparatus for predicting road shape 22 executes a procedure for predicting road shape including corners. During the execution, the control apparatus for predicting road shape 22 follows a control program stored in the aforementioned storage medium based on map data obtained from the map database 21a of the navigation control apparatus 21.

The apparatus for predicting road shape 20 may include, in terms of function, a map data reading unit for reading map data, a corner area calculating unit for calculating a corner area, a clothoid curve calculating unit for calculating a clothoid curve, a fitting unit for adjusting said clothoid curve to said corner area, and a start point position detecting unit for detecting a position of a start point or end point of said corner area.

The apparatus for predicting road shape 20 may create data related to road shape including corners at pleasure and store them in the predicted result database 25. For example, when a user such as a driver of a vehicle activates the navigation control apparatus 21 by operating an input unit (not shown), sets a destination, and searches a route to the destination, it is possible to create data related to road shape including corners corresponding to roads on the searched route. It is also possible to create data related to road shape including corners corresponding to a forward road within predetermined area on the searched route. The data related to road shape including corners can be stored in the map database 21a of the navigation control apparatus 21. In this manner, when the apparatus for predicting road shape 20 executes a procedure for predicting road shape regarding a route, data related to road shape including corners may be stored and accumulated, so that it is not necessary to repeatedly execute the procedure for predicting road shape.

Figure 2:
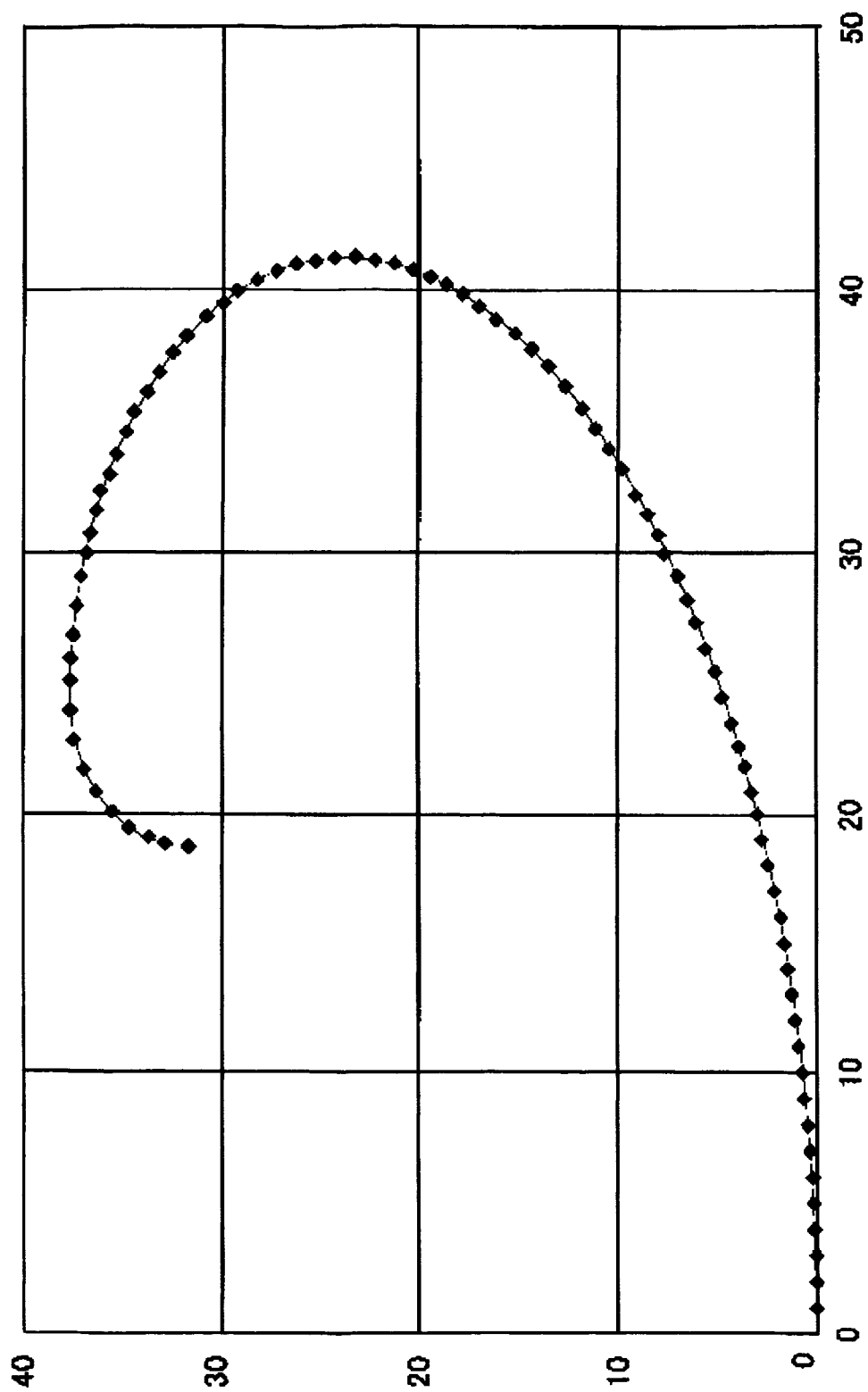
FIG. 2 is a first diagram showing exemplary clothoid curves.
Figure 3:
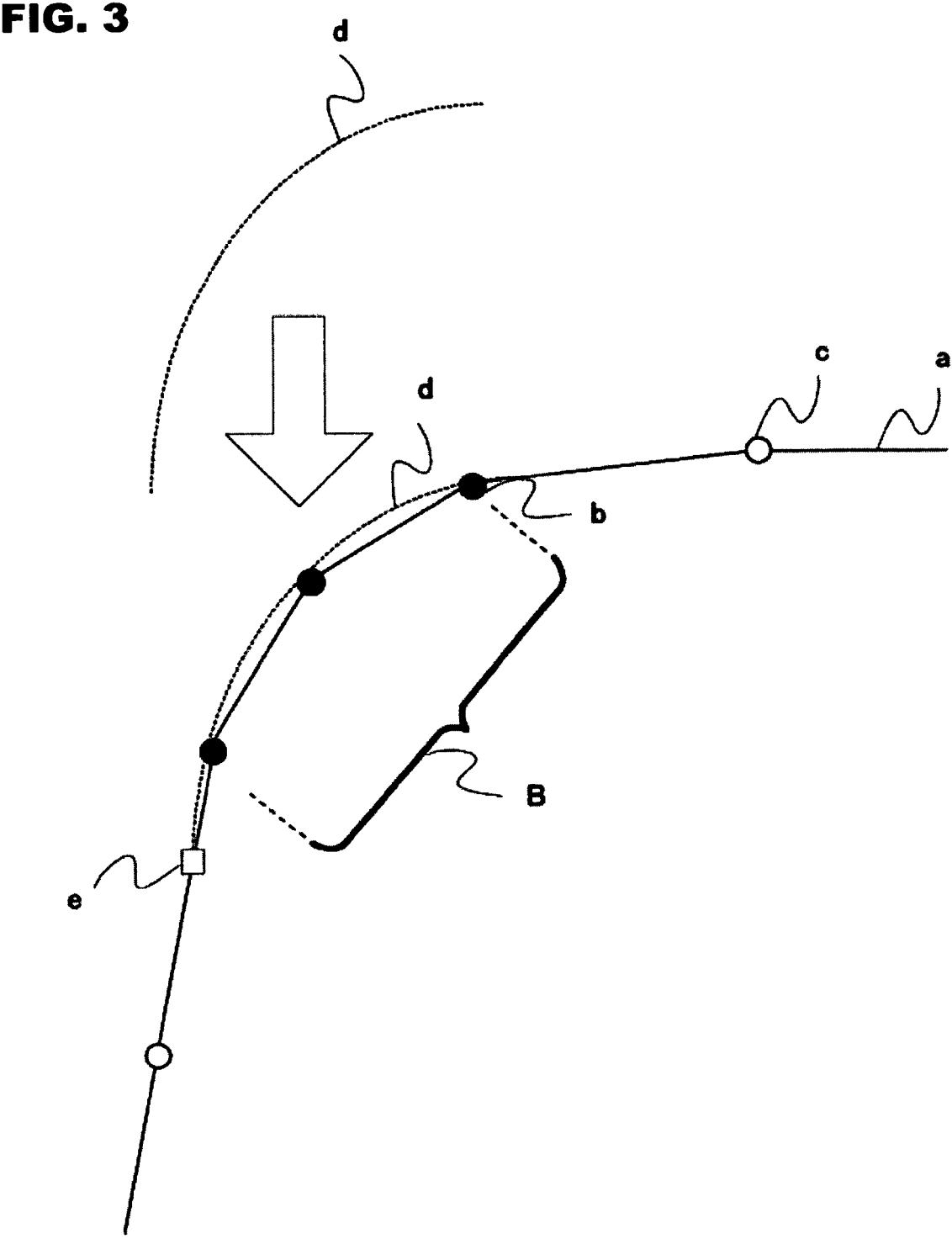
FIG. 3 is a diagram showing an exemplary operation of fitting clothoid curves.
Figure 4:
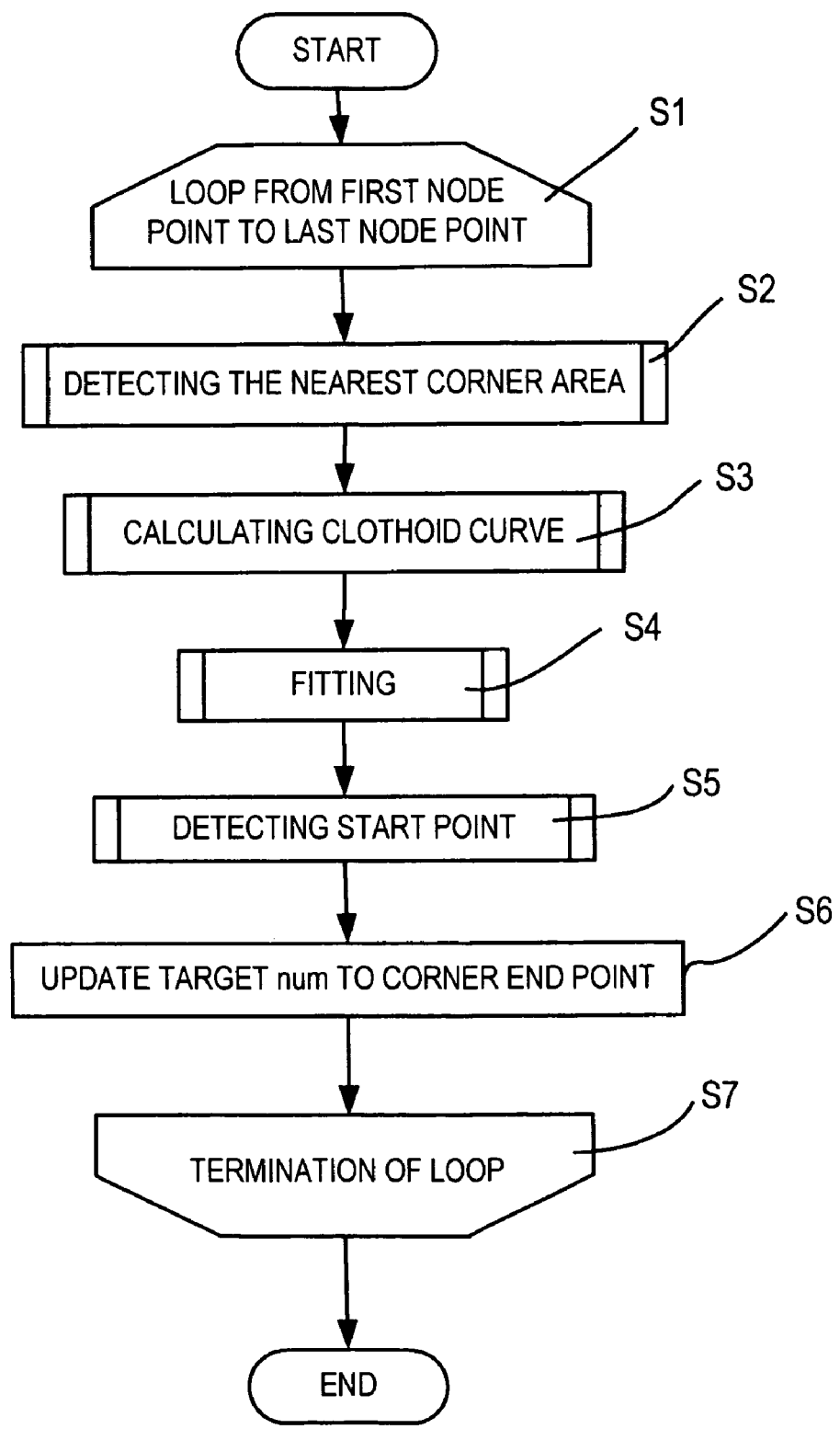
FIG. 4 is a flowchart showing entire operation procedure of the apparatus for predicting road shape.

Subsequently, an operation is described below for a case in which when the apparatus for predicting road shape 20 has such a structure. FIG. 2 is a first diagram showing exemplary clothoid curves. FIG. 3 is a diagram showing an exemplary operation of fitting clothoid curves. FIG. 4 is a flowchart showing entire operation procedure of the apparatus for predicting road shape.

When a target road for creating data related to road shape including corners is determined, the control apparatus for predicting road shape 22 starts a procedure for predicting road shape according to the target road. In this case, the control apparatus for predicting road shape 22 receives node data that represents location and shape of the target road from the map database 21a. The node data may include data for node points and links connected to each node point so that the target road is assumed as a line passing through plurality of node points. Then each node point data may include a radius or a curvature of the node point. The control apparatus for predicting road shape 22 detects a broad position of a corner area using the line passing through node points, adjusts a clothoid curve to said corner area, more specifically, executes a fitting, and predicts a start point or a radius of the corner.

The control apparatus for predicting road shape 22 operates a loop from a first node point to a last node point of the line. In case number "num" is assigned for each node point, "num" starts from "0" and the number is increased one by one. The control apparatus for predicting road shape 22 detects the nearest corner area corresponding to node point num=0. Then a node point indicating the stating point of a corner area from the node point num=0 is detected.

Then the apparatus for predicting road shape 20 executes a procedure for calculating a clothoid curve corresponding to a radius of the corner area. A clothoid curve is a curve that is increased or decreased by length of the curvature. For example, when roads are designed, a part of a clothoid curve which is increased by length of the curvature is adjusted to a start part of a corner area as described in FIG. 2. A point ♦ on the clothoid curve in FIG. 2 is plotted at each time when a distance from a start point (the origin of coordinates) increases 1 m.

However, if there is a road including a straight line joining a curve which has a fixed curvature, rapid steering is needed at the junction between the straight line and the curve because it is necessary to rapidly change to the turning angle corresponding to the curvature of the curve. Thereby it may occur that the vehicle loses control at the junction. Generally, when a driving vehicle enters such a corner area, a driver gradually steers to adjust to a rudder angle corresponding to a fixed curvature and of course the vehicle is moving even during the steering. More specifically, the vehicle moves in a curve whose curvature increases along with the movement of the vehicle. Thus practically, a clothoid curve can be used to represent road shape at a start part of a corner area and the radius of the clothoid curve is found by the following equation (5):

$$RL = A^2 \quad (5)$$

wherein R is a radius, L is a length of a curve, and A is a clothoid coefficient as a constant number.

After the clothoid curve corresponding to the radius of the corner area is calculated, the control apparatus for predicting road shape 22 fits the clothoid curve to a line passing through node points corresponding to the corner area of in FIG. 3. In FIG. 3, line "a" is a line passing through node points, "b" (●) are node points in the corner area, and "c" (○) are node points in straight line areas. In FIG. 3, there are three node points ● detected in the corner area B by a procedure for detecting the nearest corner area, and d is a clothoid curve calculated by the procedure. The control apparatus for predicting road shape 22 executes the fitting for the clothoid curve d to the corner area B.

Then the control apparatus for predicting road shape 22 determines a start point position of the corner based on the fitting result. A position e (□) in FIG. 3 is determined as the start point position. An end point position of the corner area B can be determined by executing the same procedure in the reverse direction.

When the start point position of the corner is determined, the control apparatus for predicting road shape 22 updates "num" of a target node point to an endmost node point in the corner area B, that is, "num" of the corner endmost point. Then the loop regarding the corner endmost point is executed as next target point. Then the loop is terminated when "num" of the target node point is updated to identify "num" of the last node point in a line passing through node points corresponding to the target road.

The flowchart of FIG. 4 for the overall procedure for predicting road shape includes the following steps:
Step S1—Operates a loop from a first node point to a last node point.
Step S2—Executes a procedure for detecting the nearest corner area.
Step S3—Executes a processing for calculating a clothoid curve.
Step S4—Executes a fitting.
Step S5—Executes a procedure for detecting a start point position.
Step S6—Updates target "num" to a corner endmost point.
Step S7—Stops the loop and the procedure is terminated.

Figure 5:
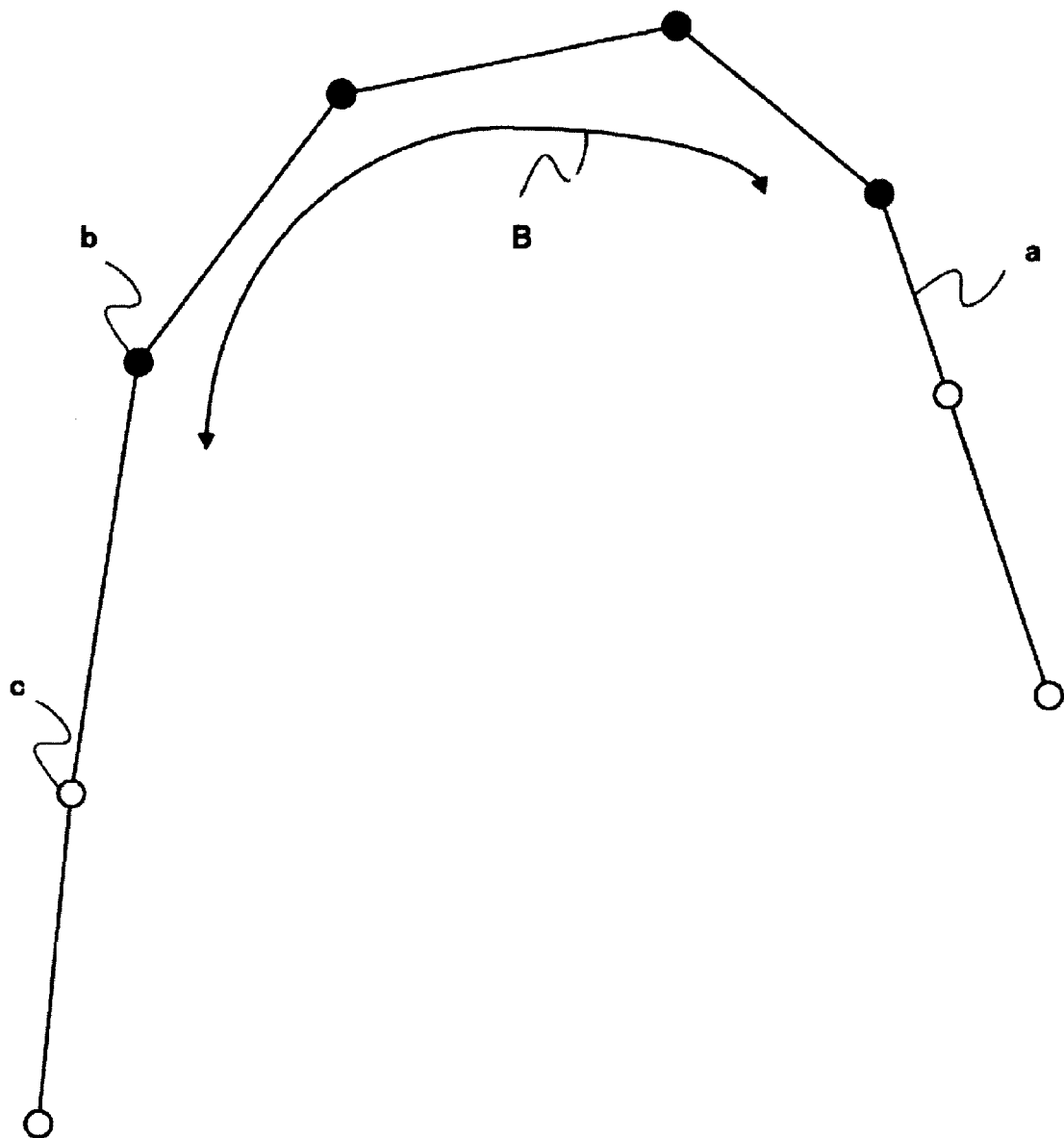
FIG. 5 is a diagram showing a first exemplary corner area detecting method.
Figure 6:
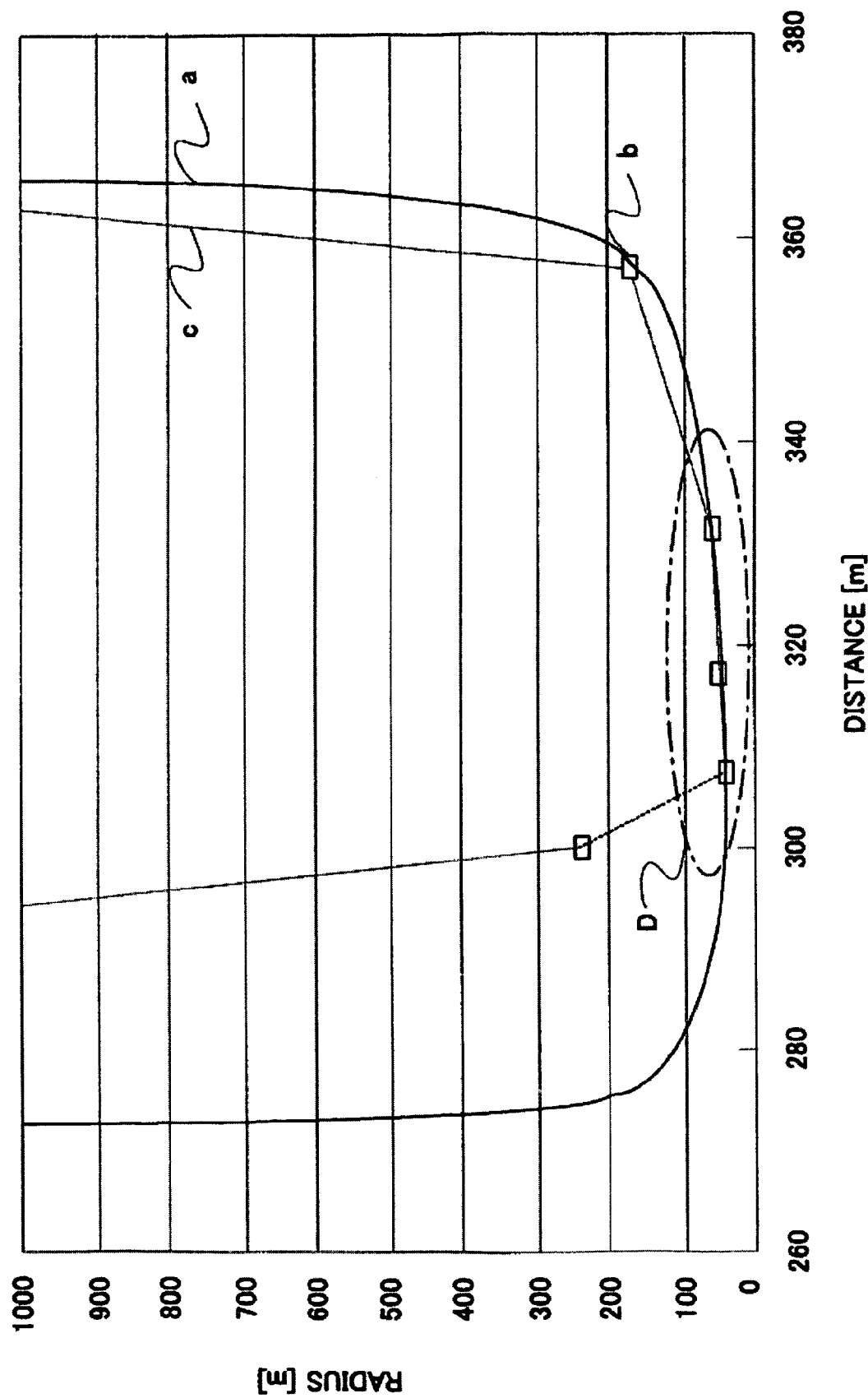
FIG. 6 is a diagram showing a second exemplary corner area detecting method.
Figure 7:
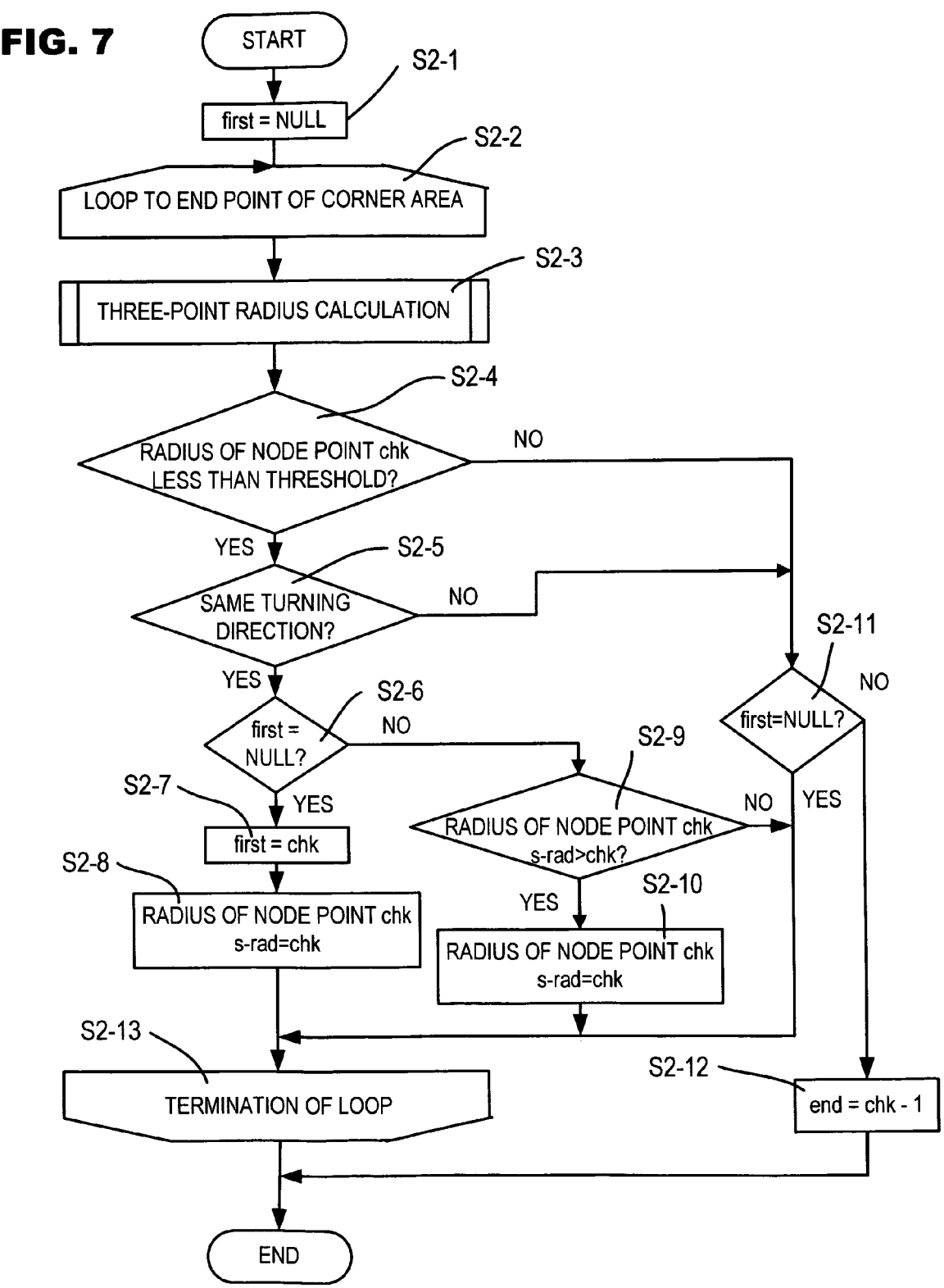
FIG. 7 is a flowchart showing an exemplary procedure for detecting the nearest corner area.

The procedure for detecting the nearest corner area is described below in detail. FIG. 5 is a diagram showing a first exemplary corner area detecting method. FIG. 6 is a diagram showing a second exemplary corner area detecting method. FIG. 7 is a flowchart showing an exemplary procedure for detecting the nearest corner area.

The control apparatus for predicting road shape 22 detects the corner area B as shown in FIG. 5. Line "a" is a line passing through the node points. Points "b" shown as "●" are node points in the corner area whose radius is less than a threshold, and points "c" shown as "○" are node points on straight lines whose radius is greater than or equal to the threshold. The threshold, for example, is a radius of 300 m. There are four node points "b" detected in the corner area B in FIG. 5.

FIG. 6 shows that it is difficult to reproduce a radius of an actual road even by creating a curve passing through node points. In FIG. 6, "a" is a curve indicating a radius of a road based on a conventional road design map. Points "b" shown as "□" are node points of navigation data of a road exemplary of a corner entrance defined by low density (widely spaced) points. The radius of "a" is calculated from the node points of the points included in the node data for a general vehicle navigation system. Line "c" is a line passing through points "b" and shows that the curve "a" is obviously misfit to the radius of the actual road. This is because in area with a large radius such as corner entrances, intervals between node points are wide. For example, the intervals are approximately 6 to 8 m or more. Meanwhile, in the area "D" in FIG. 6, the line "c" passing through points "b" is substantially identical to the curve "a" so that in that area the curve "a" accurately indicates the radius of the actual road. That is because in area with a small radius such as in a mid section of the corner area, intervals between node points are narrow. For example, the intervals are approximately 2 m. Thus in high-density area, that is, in the area with narrow intervals between node points, radiuses which are calculated by using node points can be approximately identical to the radiuses of actual roads.

Thus, a radius can be accurately calculated from adjoining three node points in a detected corner area so that a minimum radius in a corner area at a corresponding node point may be found.

The control apparatus for predicting road shape 22 initializes a memory area "first" to "NULL" in which a start point of a corner area is stored as node point "num". Subsequently the apparatus for predicting road shape 20 operates a loop to an end point of the corner area. The loop may be started from an optional "num" of a node point as a target node point and the number of the target node point can be designated as "chk". Then the control apparatus for predicting road shape 22 executes a procedure for calculating three-point-radius to calculate a radius at the node point "chk". The three points are the target node point "chk" and the preceding and following node points of the target node point. The procedure for calculating is executed based on a shape composed of the adjoining three node points from which a radius of the node point "chk" is calculated.

The control apparatus for predicting road shape 22 determines whether or not the calculated radius of the node point "chk" is less than a threshold and further determines whether or not the node point "chk" exists in a corner area. If it is determined that the radius is less than the threshold and the node point "chk" is in the corner area, the control apparatus for predicting road shape 22 determines whether a turning direction is same and further determines whether the turning direction has any change. This is because curve having an S-configuration is recognized as a set of corners that end at each change in direction.

If it is determined that the turning direction is same and has no change, the control apparatus for predicting road shape 22 determines whether or not the memory area "first" is NULL by determining whether there is any value stored in the memory area "first". If it is determined that there is no value stored in the memory area "first" the control apparatus for predicting road shape 22 stores and registers "chk" in the memory area "first" and further registers the node point "chk" as a start point of the corner area. Next the control apparatus for predicting road shape 22 stores and registers the radius of the node point "chk" in a memory area "s-rad" in which the minimum radius of the corner area is stored. Then a loop is operated wherein a next node point is determined as a target node point.

Meanwhile, if the memory area "first" is not NULL and there is any value in the memory area "first" the control apparatus for predicting road shape 22 determines whether the radius of the node point "chk" is smaller than the radius registered in the memory area "s-rad" If the radius of "chk" is smaller, the radius registered in the memory area "s-rad" is changed to the radius of the node point "chk" and updated. If the radius of "chk" is not smaller, the loop is operated wherein a next node point is determined as a target node point without changing the registered radius.

If it is determined that the radius is greater than or equal to the threshold and the node point "chk" is not in the corner area, and if it is further determined that the turning direction is different and has any change, the control apparatus for predicting road shape 22 determines whether the memory area "first" is NULL and further determines whether there is any value stored in the memory area "first" If it is determined that there is no value stored in the memory area "first" the loop is operated wherein a next node point is determined as a target node point. If it is determined that the memory area "first" is not NULL and that there is any value stored in the memory area "first" the control apparatus for predicting road shape 22 stores and registers "chk−1" in a memory area "end" in which node point "num" is stored as an end point of the corner area. Then the "chk−1" is registered as the end point of the corner area instead. The control apparatus for predicting road shape 22 terminates the procedure for detecting the nearest corner area herewith.

The steps in the flowchart of FIG. 7 for the procedure of detecting a corner is described below.

Step S2-1—Initializes a memory area "first" to NULL

Step S2-2—Operates a loop to an end point of a corner area.

Step S2-3—Executes a procedure for calculating three-point-radius.

Step S2-4—Determines whether a radius of a node point "chk" is less than a threshold. If the radius of the node point "chk" is less than the threshold, the procedure proceeds to step S2-5. If the radius of the node point "chk" is greater than or equal to the threshold, the procedure proceeds to step S2-11.

Step S2-5—Determines whether a turning direction is same. If the turning direction is same, the procedure proceeds to step S2-6. If the turning direction is different, the procedure proceeds to step S2-11.

Step S2-6—Determines whether the memory area "first" is NULL. If the memory area "first" is ULL the procedure proceeds to step S2-7. If the memory area "first" is not NULL the procedure proceeds to step S2-9.

Step S2-7—Stores and registers "chk" in the memory area "first"

Step S2-8—Stores and registers the radius of the node point "chk" in a memory area "s-rad".

Step S2-9—Determines whether the radius of the node point "chk" is smaller than a radius stored in the memory area "s-rad". If the radius of the node point "chk" is smaller than the radius stored in the memory area "s-rad" the procedure proceeds to step S2-10. If not, the procedure proceeds to step S2-13.

Step S2-10—Changes the radius stored in the memory area "s-rad" to the radius of the node point "chk" and updates.

Step S2-11—Determines whether the memory area "first" is "NULL". If the memory area "first" is NULL the procedure proceeds to step S2-13. If not, the procedure proceeds to step S2-12.

Step S2-12—Stores and registers "chk−1" in the memory area "end" and the procedure is terminated.

Step S2-13—Stops the loop and the procedure is terminated.

Figure 8:
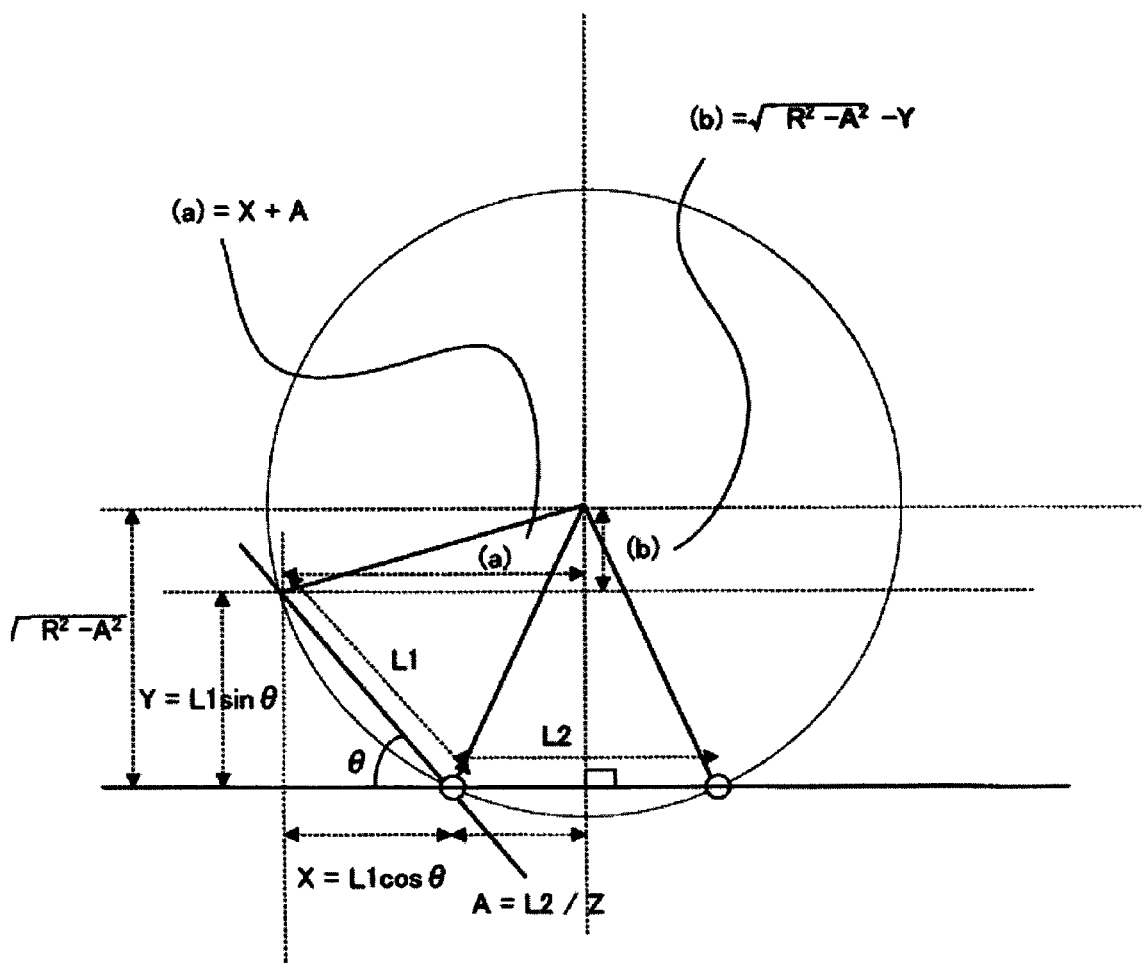
FIG. 8 is a diagram showing an exemplary radius calculation method for a circle which has three pass node points.
Figure 9:
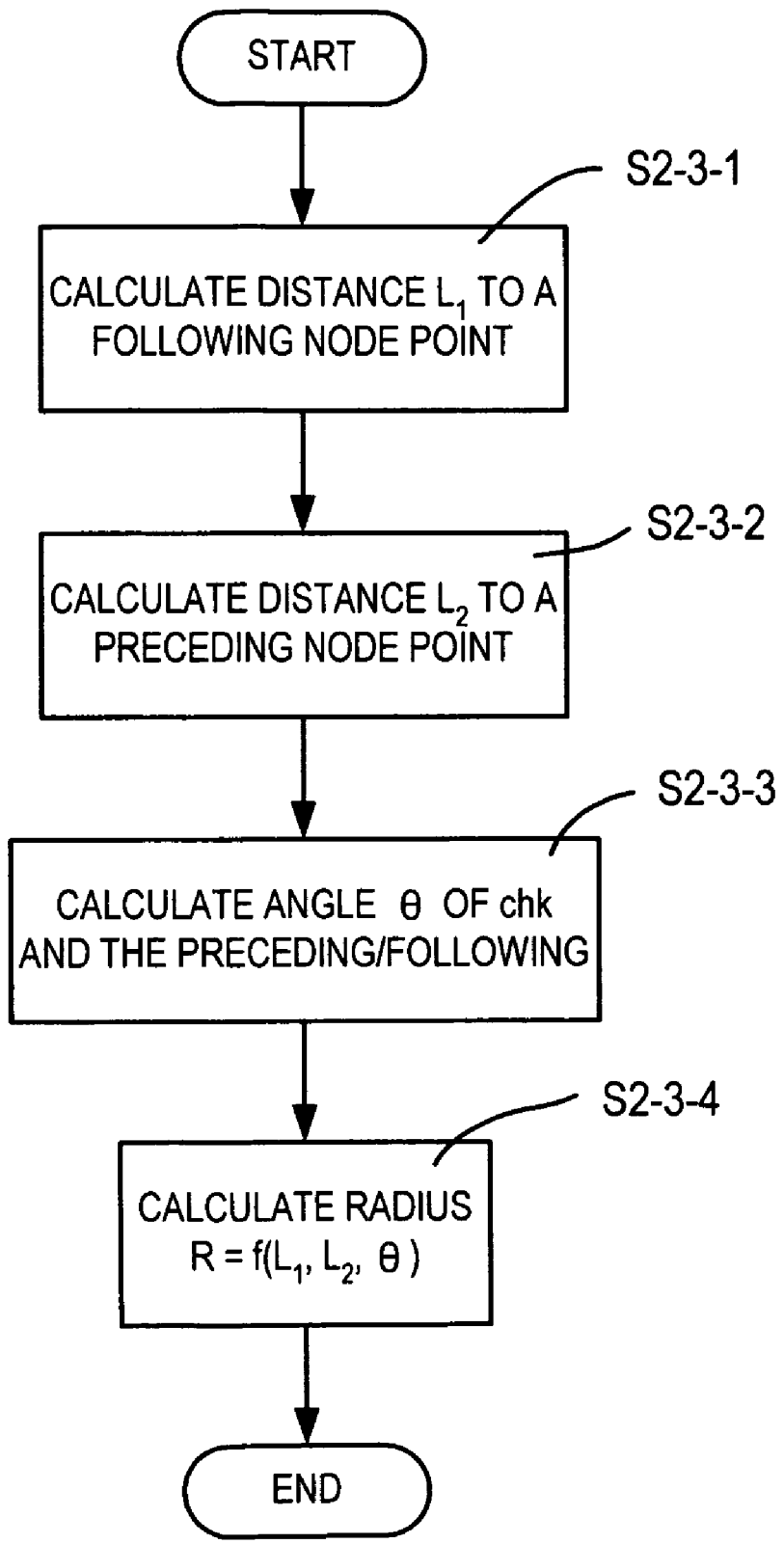
FIG. 9 is a flowchart showing an exemplary operation procedure for calculating three-point-radius.

Next, the procedure for calculating a three-point-radius is described below in detail. FIG. 8 is a diagram showing an exemplary radius calculation method for a circle that has three pass node points. FIG. 9 is a flowchart showing an exemplary operation procedure for calculating three-point-radius.

A circle in FIG. 8 has three pass node points; a target node point "chk" and the preceding/following node points. If a radius of the circle is R, length of each part is as shown in FIG. 8. In this case, the sum of (a) raised to the second power and (b) raised to the second power is equal to R raised to the second power so that the following equation (6) is derived:

$$R^2 = (a)^2 + (b)^2. \quad (6)$$

In the following equation (7), lengths are substituted for (a) and (b) of equation (6).

$$R^2 = X^2 + 2XA + A^2 + R^2 - A^2 - 2Y\sqrt{R^2 - A^2} + Y^2 \quad (7)$$

The following Equation (8) is a transformed version of Equation (7).

$$2Y\sqrt{R^2 - A^2} = X^2 + Y^2 + 2XA \quad (8)$$

The following Equation (9) is a further transformed version of Equation (8).

$$R^2 - A^2 = \{(X^2 + Y^2 + 2XY)/2Y\}^2 \quad (9)$$

The following Equation (10) is a further transformed version of Equation (9).

$$R^2 = \{(X^2 + Y^2 + 2XA)/2Y\}^2 + A^2 \quad (10)$$

Finally, the following Equation (11) is a transformed version of Equation (10).

$$R = (L_1^2 + 2L_1L_2 \cos \theta + L_2^2)/(2 \sin \theta)^2 \quad (11)$$

Thus, in terms of Equation (11), it is determined that a radius R is a function of $L_1$, $L_2$, and $\theta$.

The control apparatus for predicting road shape 22 calculates a distance $L_1$ between a node point "chk" and "chk−1". The node point "chk−1" is a following node point in the direction of travel. Then the control apparatus for predicting road shape 22 calculates a distance $L_2$ between the node point "chk" and "chk+1". The node point "chk+1" is a preceding node point in the direction of travel. Then the control apparatus for predicting road shape 22 calculates an angle between two lines; a line passing through the node point "chk" and the node point "chk−1" and a line passing through the node point "chk" and the node point "chk"+1 Calculated $L_1$, $L_2$, and are assigned into the equation (7) to find radius R of the circle and the procedure for calculating three-point-radius is terminated. The radius at the node point "chk" can be obtained herewith.

The steps in the flowchart of FIG. 9 for calculating the radius defined by three points are described below.

Step S2-3-1—Calculates $L_1$ which is a distance to a following node point.

Step S2-3-2—Calculates $L_2$ which is a distance to a preceding node point.

Step S2-3-3—Calculates an angle θ between a line passing through a node point "chk" and the following node point, and another line passing through the node point "chk" and the preceding node point.

Step S2-3-4—Calculates R which is a radius of a circle and the procedure is terminated.

Figure 10:
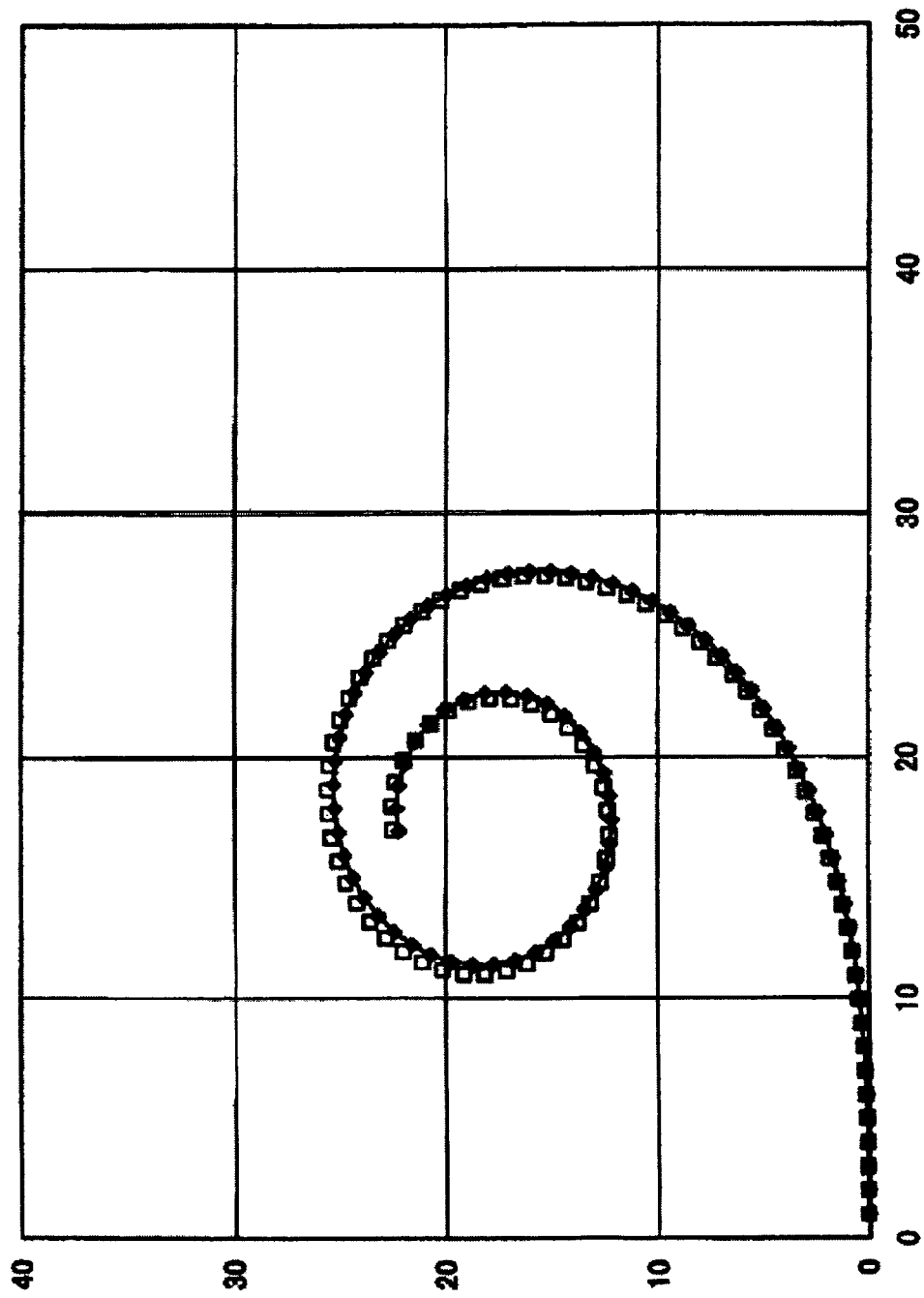
FIG. 10 is a diagram showing a first exemplary comparison between clothoid curves.
Figure 11:
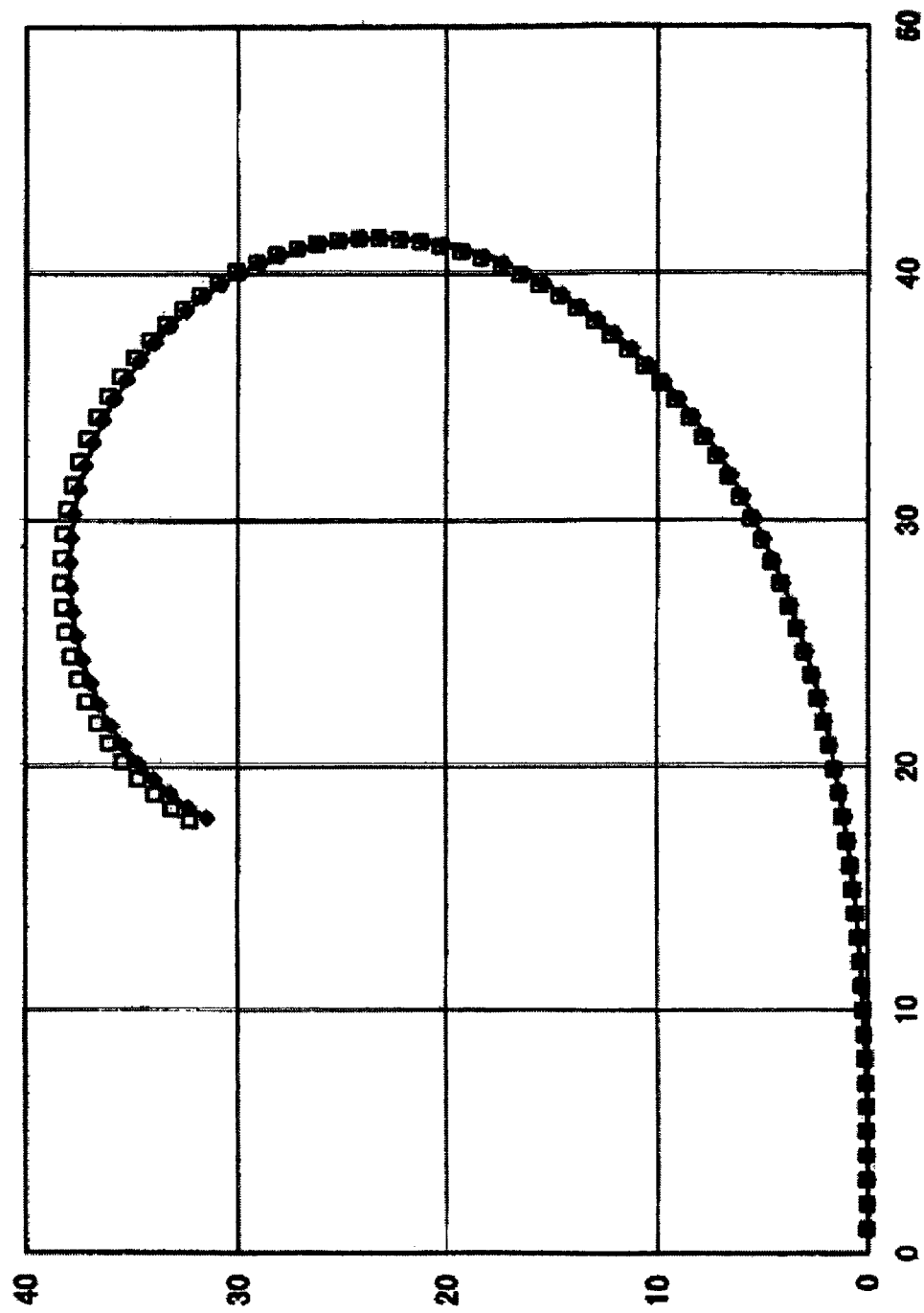
FIG. 11 is a diagram showing a second exemplary comparison between clothoid curves.
Figure 12:
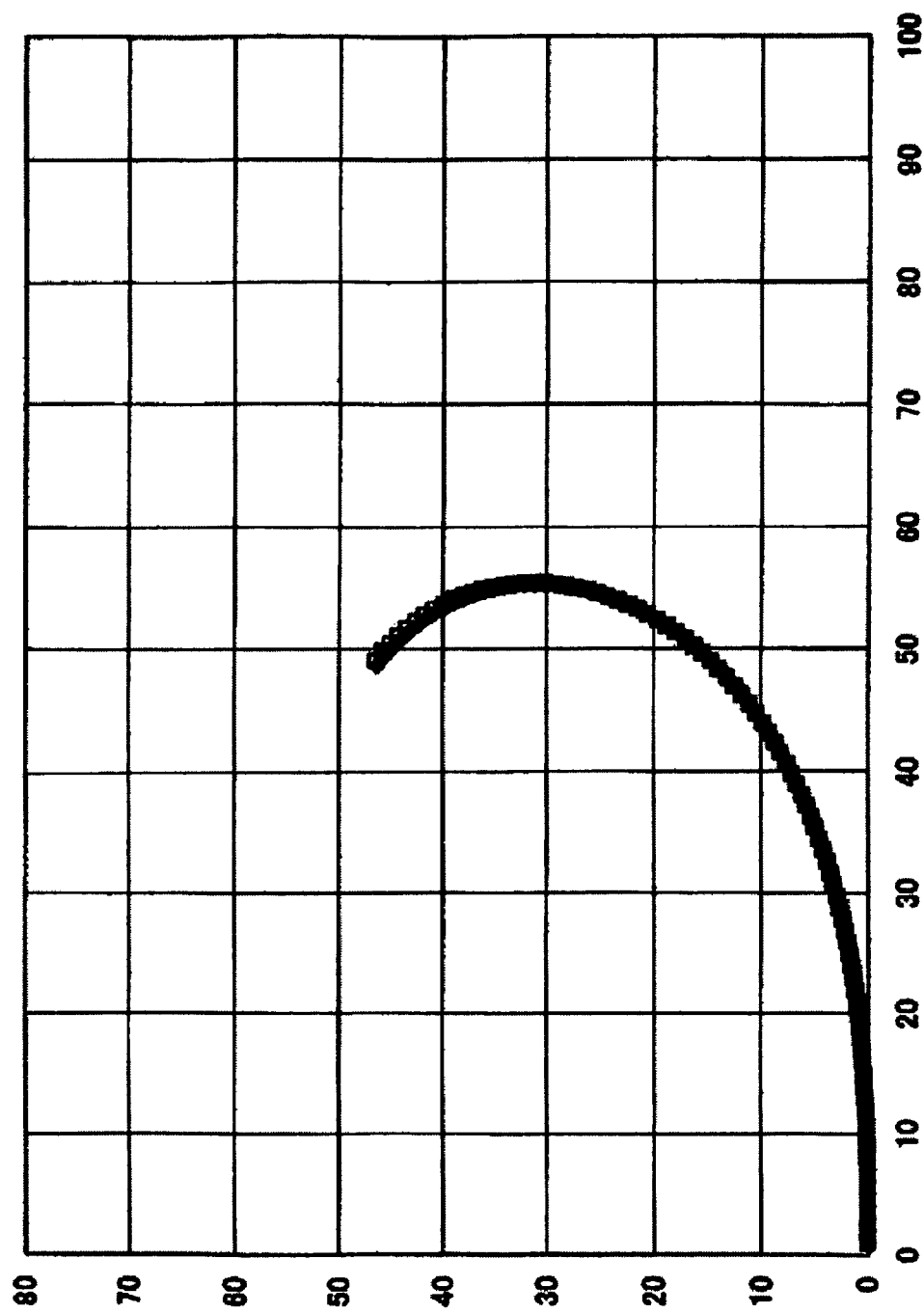
FIG. 12 is a diagram showing a third exemplary comparison between clothoid curves.
Figure 13:
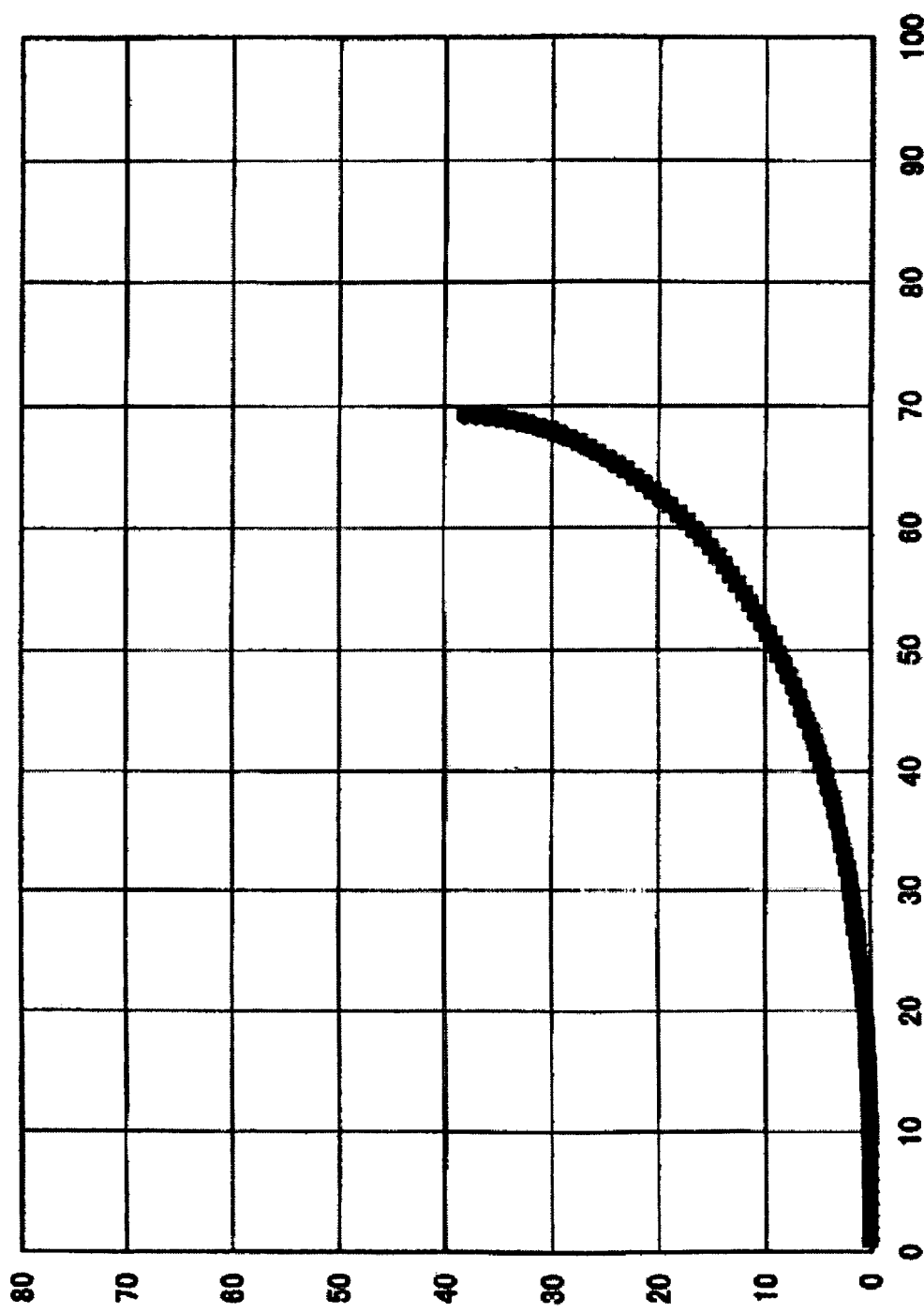
FIG. 13 is a diagram showing a fourth exemplary comparison between clothoid curves.
Figure 14:
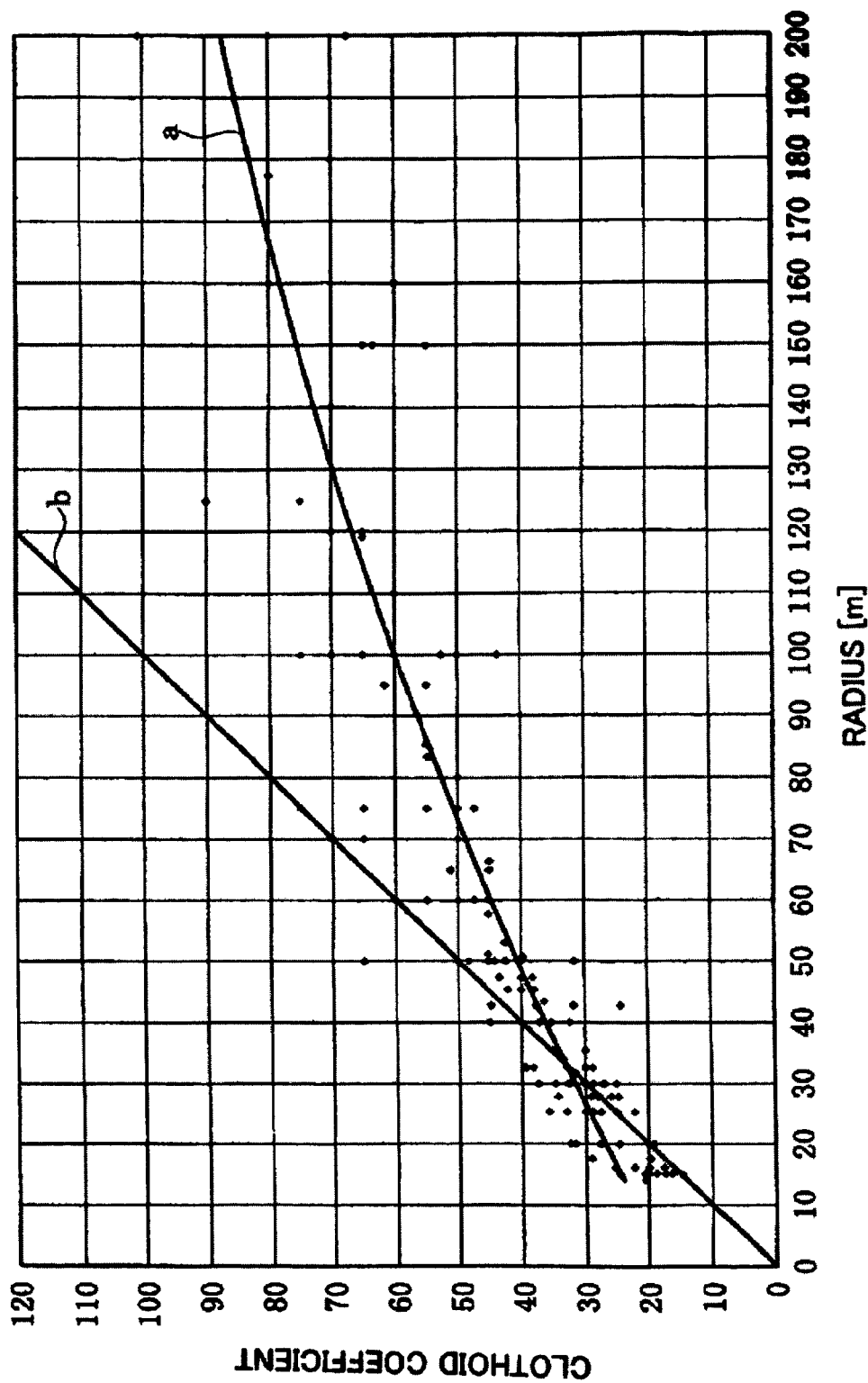
FIG. 14 is a diagram showing an example of a correlation between a minimum radius and a clothoid coefficient of a corner area according to the embodiment of the present invention.
Figures 15, 16:
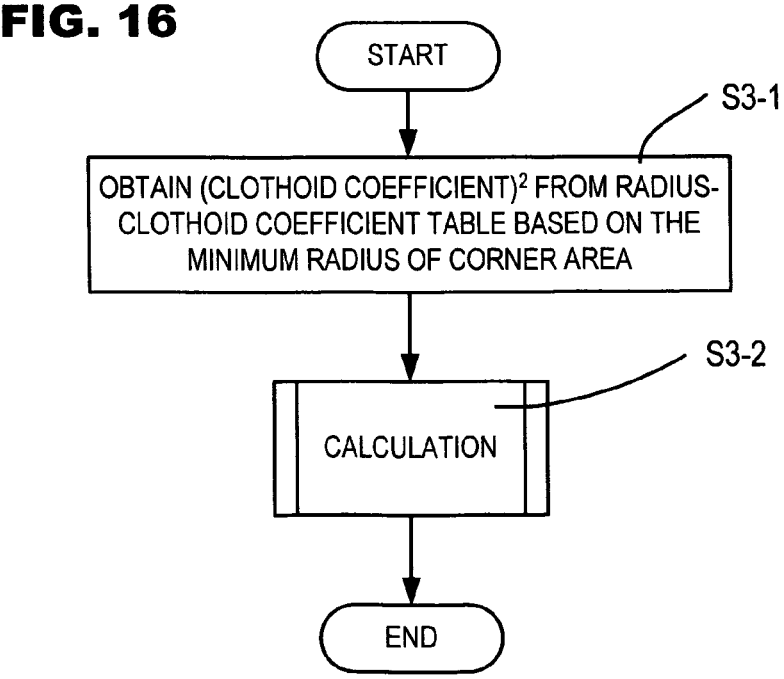
FIG. 15 is a diagram showing an exemplary radius-clothoid coefficient table.
FIG. 16 is a flowchart showing an exemplary procedure for calculating clothoid curves.

Next, a procedure for calculating a clothoid curve is described below in detail. FIG. 10 is a first diagram showing an exemplary comparison between clothoid curves. FIG. 11 is a diagram showing a second exemplary comparison between clothoid curves. FIG. 12 is a diagram showing a third exemplary comparison between clothoid curves. FIG. 13 is a diagram showing a fourth exemplary comparison between clothoid curves. FIG. 14 is a diagram showing an exemplary correlation between the minimum radius of a corner area and a clothoid coefficient. FIG. 15 is a diagram showing an exemplary radius-clothoid coefficient table. FIG. 16 is a flowchart showing an exemplary operation procedure for calculating clothoid curves.

The control apparatus for predicting road shape 22 calculates clothoid curves, using approximate expressions that are thought out by inventors of the present invention. Therefore, the approximate expressions will be described below for a start.

Practically, X-Y coordinates of a clothoid curve are calculated by polynomial expressions such as the following equations (8) and (9). (Refer to lothoid Pocketbook 36th edition edited by Japan Road Association, published on May 1, 1990 by Maruzen Co., Ltd.).

$$X = L \times \left(1 - \frac{L^2}{40R^2} + \frac{L^4}{3456R^4} - \frac{L^6}{599040R^6} + \frac{L^8}{17547260R^8} \cdots \right) \quad (12)$$

$$Y = \frac{L^2}{6R \times \left(1 - \frac{L^2}{56R^2} + \frac{L^4}{7040R^4} - \frac{L^6}{1612800R^6} + \frac{L^8}{588349440R^8} \cdots \right)} \quad (13)$$

In the equations (12) and (13), L is a distance from a start point of a clothoid curve, that is called a curve length, and R is a radius. The relationship between L and R is described in Equation (5).

Equations (12) and (13), however, are equations of high degree so that the control apparatus for predicting road shape 22 may have more loads if calculating a clothoid curve by plotting many points as shown in FIG. 2. Thus, the inventors of the present invention tested through many simulation experiments and found that it is possible to calculate X-Y coordinates of a clothoid curve by using the approximate expressions (1) and (2):

$$X = X_0 + \sum_L \cos \phi \quad (1)$$

$$Y = Y_0 + \sum_L \cos \phi \quad (2)$$

wherein $X_0$ and $Y_0$ are X-Y coordinates at a start point of a clothoid curve and L is a distance, called a curve length, from the start point of the clothoid curve. In the clothoid curve as described in FIG. 2, the start point is at the origin of the coordinates so that $X_0$ and $Y_0$ are both zero "0". The angle φ is computed by the following equation (3)

$$\phi = \alpha + 2kL \quad (3)$$

wherein α is an angle for the start point of the clothoid curve and "k" is computed by the following equation (4)

$$k = \frac{28}{A^2} \quad (4)$$

wherein A is a clothoid coefficient.

In FIGS. 10 to 13, a clothoid curve which is created with the X-Y coordinates based on the polynomial expressions (12) and (13) is compared with another clothoid curve which is created with the X-Y coordinates based on the approximate expressions (1) and (2). In FIGS. 10 to 13, ◆ denotes a plotted point which is determined by the X-Y coordinates based on the polynomial expressions (12) and (13), and □ denotes a plotted point which is determined by the X-Y coordinates based on the approximate expressions (1) and (2). Note that FIG. 10 represents a case when a clothoid coefficient "A" is 20. A clothoid coefficient "A" is 30 in FIG. 11, 40 in FIG. 12, and 50 in FIG. 13.

As described in FIG. 10 to 13, a clothoid curve which is created with the X-Y coordinates based on the approximate expressions (1) and (2) is approximately consistent with a clothoid curve which is created with the X-Y coordinates based on the polynomial expressions (12) and (13). Thus, a clothoid curve may be calculated by the approximate expressions (1) and (2), and loads against the control apparatus for predicting road shape 22 can be decreased.

Next, a radius-clothoid coefficient table is described below. The radius-clothoid coefficient table is produced in advance and stored in a clothoid coefficient database 23. Based on a road design map, the approximate expressions are obtained from using a relation between an actual radius of a road in a corner area and a clothoid coefficient of a clothoid curve which is used at design of the road. FIG. 14 represents a relation between a radius of a road and a clothoid coefficient. A point ◆ denotes a plotted clothoid coefficient in FIG. 14. A curve "a" represents a relation between a radius and a clothoid coefficient based on the point position. More specifically, the curve is found by a polynomial expression, for example, Equation (14).

$$A = -0.0007\,R^2 + 0.4961\,R + 17.414 \quad (14)$$

Line "b" is computed by the following equation (15)

$$A = R \quad (15)$$

wherein A is the clothoid coefficient and R is a radius.

A radius-clothoid coefficient table showing a relation between radius and clothoid coefficient in FIG. 15 is created based on a polynomial expression such as the equation (14), and stored in the clothoid coefficient database 23. Note that, according to the radius-clothoid coefficient table in FIG. 15, clothoid coefficients raised to the second power are listed in the right column and radiuses are listed in increments of 10 with corresponding to the aforementioned clothoid coefficients raised to the second power. In case that the values of the radiuses linear, a linear interpolation may be used for obtaining the values. Although approximate expressions are used for finding a relation between clothoid curve and clothoid coefficient, the relation can be also found by statistically analyzing clothoid coefficients. For example, it is available to calculate an average of clothoid coefficients corresponding to radiuses and to produce a radius-clothoid coefficient based on the analyzing.

The control apparatus for predicting road shape 22 obtains the clothoid coefficients raised to second power from the radius-clothoid coefficient table in FIG. 15, based on the minimum radius of a corner stored in the memory area "s-rad". Then the control apparatus for predicting road shape 22 executes a procedure for calculating a clothoid curve based on the clothoid coefficient raised to the second power and a start point of the corner which is registered in the memory area "first" Then the procedure is terminated.

The steps in the flowchart of FIG. 16 are described below.

Step S3-1—Obtains a value which is raised a clothoid coefficient to the second power in a radius-clothoid coefficient table based on the minimum radius of a corner area.

Step S3-2—Executes an operation procedure and the processing is terminated.

Figure 17:
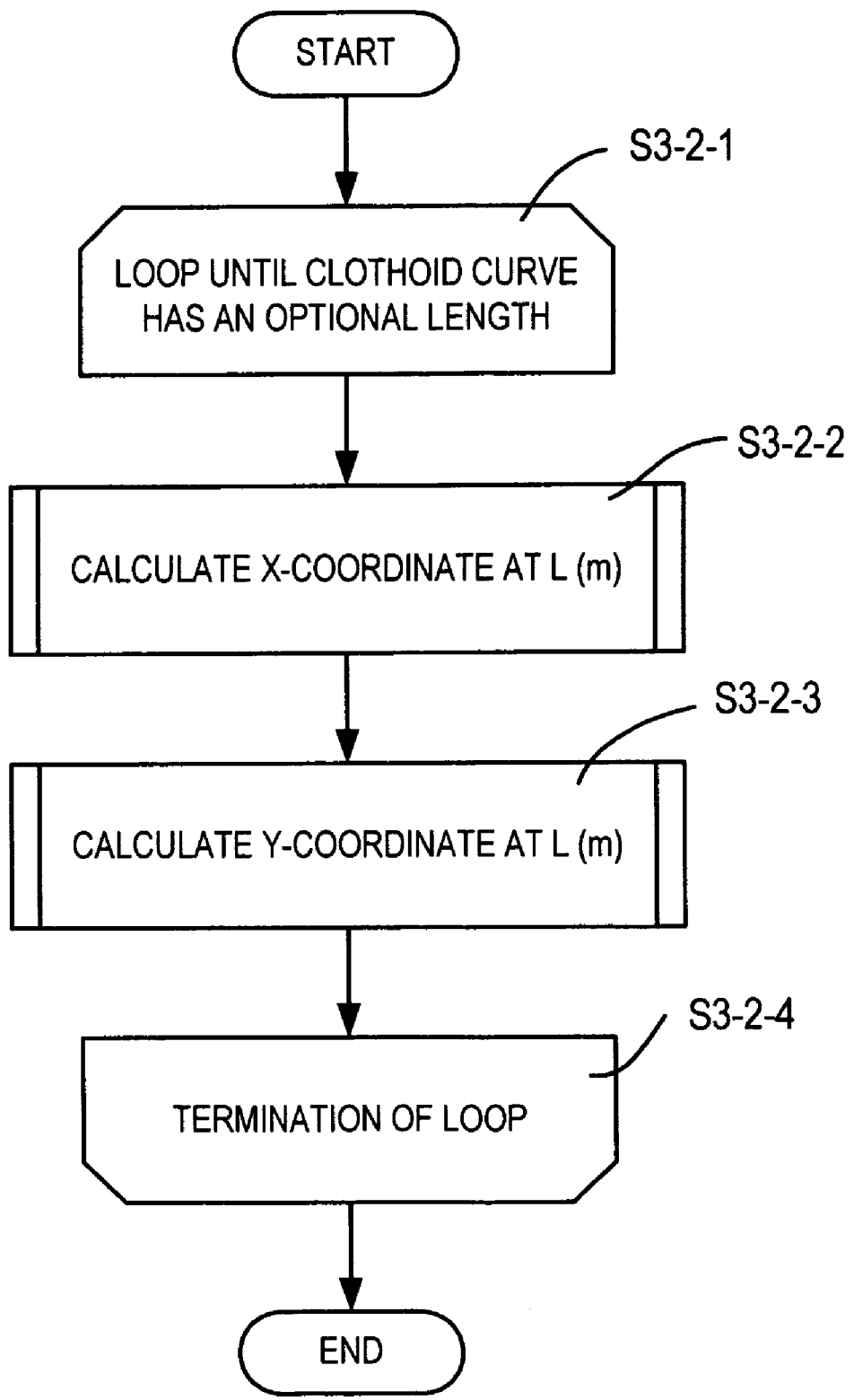
FIG. 17 is a flowchart showing an exemplary calculation procedure.

Next, the operation procedure in step S3-2 is described below in detail. FIG. 17 is a flowchart showing an exemplary calculation procedure. The control apparatus for predicting road shape 22 operates a loop for an optional length of a clothoid curve, for example, 100 m of the clothoid curve. The loop in FIG. 17 may be initiated from a point which is 1 m away from a start point (the origin of coordinates) on the clothoid curve. In other words, the loop may be initiated from the point which has 1 m of curve length L. X-Y coordinates may be sequentially calculated at points in increments of 1 m of the distance from the start point. Then when a point which is 100 m away from the start point is calculated, in other words, when a point which has 100 m of curve length is calculated, the loop is terminated.

The control apparatus for predicting road shape 22 calculates X-Y coordinates at each point with using the approximate expressions (1) and (2). When X-Y coordinates at a point which has 100 m of curve length L are calculated, the loop is terminated and then the calculation procedure is terminated. Thus, it is possible to obtain X-Y coordinates at 100 points on one clothoid curve and the clothoid curve may be calculated as described in FIG. 2 and FIG. 10 through 13.

The steps in the flowchart of FIG. 17 are described below.

Step S3-2-1—Operates a loop until a clothoid curve has an optional length.

Step S3-2-2—Calculates an X-coordinate at a point which is at L m.

Step S3-2-3—Calculates a Y-coordinate at the point which is at L m.

Step S3-2-4—Stops the loop and the procedure is terminated.

Figure 18:
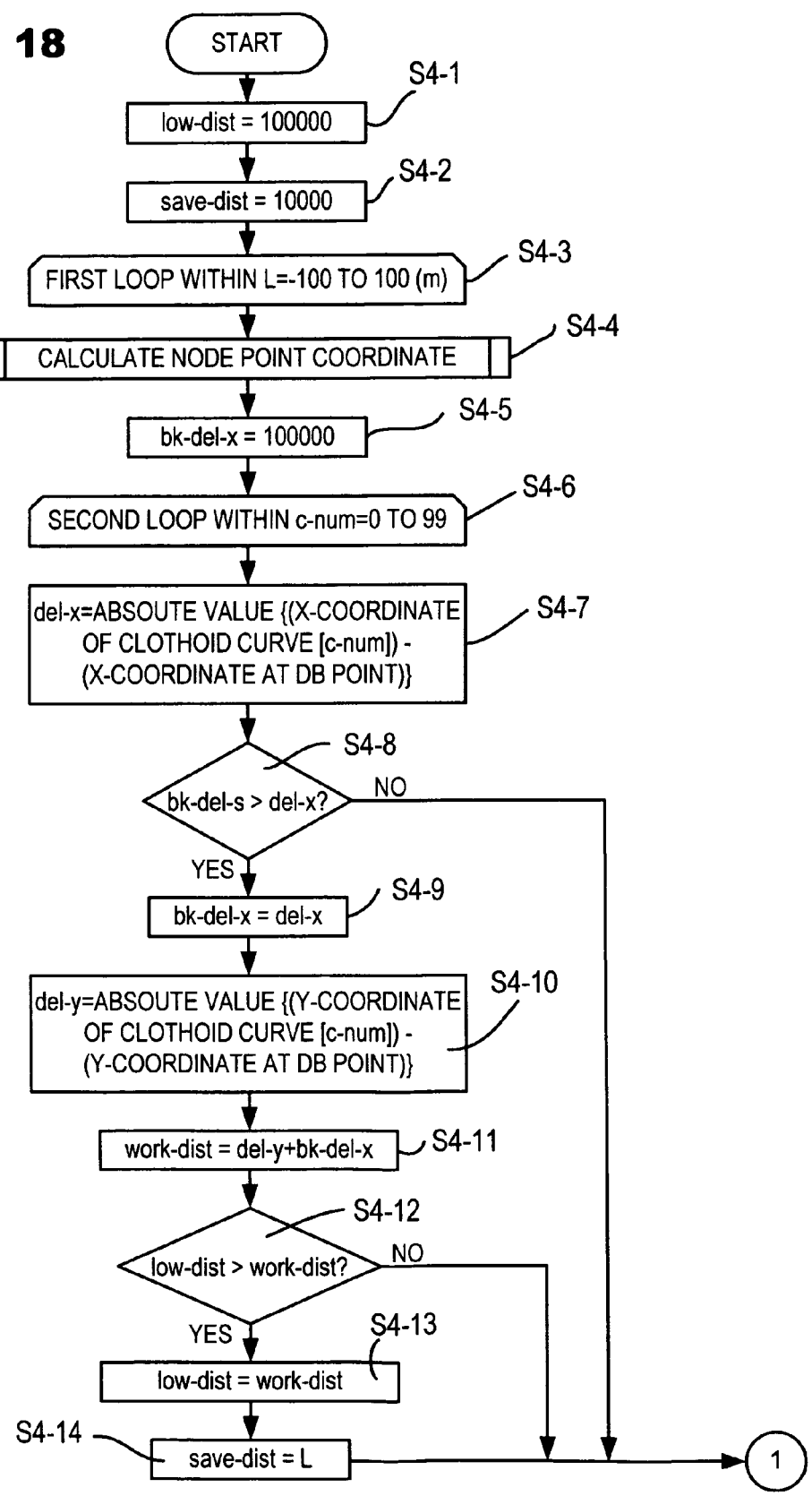
FIG. 18 is a flowchart showing a first portion of an exemplary fitting procedure.
Figure 19:
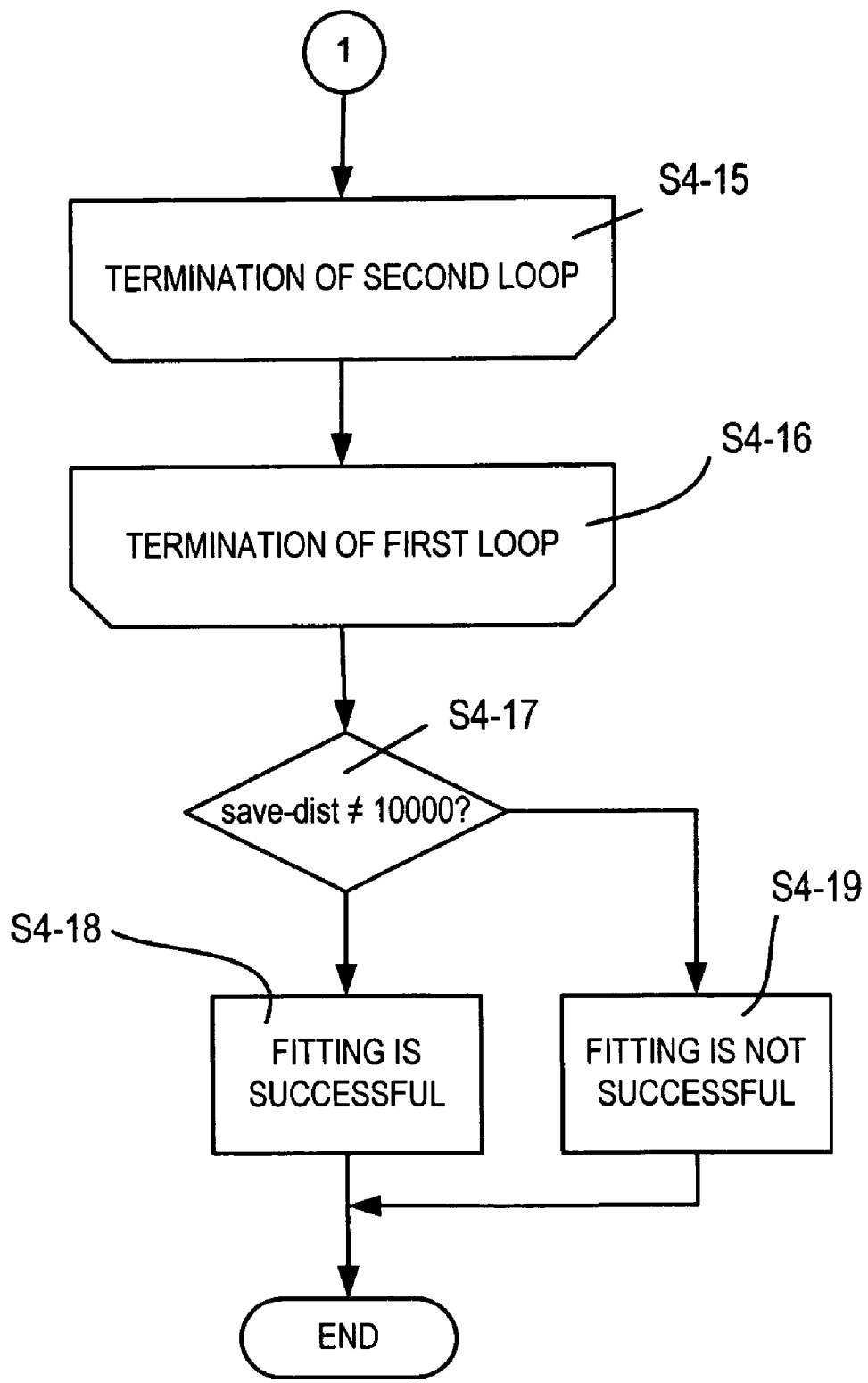
FIG. 19 is a flowchart showing a second portion of the exemplary fitting procedure.

Next, the fitting is described below. FIG. 18 is a flowchart showing a first portion of an exemplary operation procedure for fitting. FIG. 19 is a flowchart showing a second portion of the exemplary operation procedure for fitting.

The control apparatus for predicting road shape 22 stores and sets "100000" in a memory area "low-dist" in which a fitting error rate is stored, as well as "10000" in a memory area "save-dist" in which a fitting result is stored. Then the control apparatus for predicting road shape 22 operates a first loop to sequentially search from distance L=−100 m to +100 m on a target clothoid curve for fitting. Then the control apparatus for predicting road shape 22 executes a procedure for calculating node point coordinates to calculate coordinates of target node points for a fitting when the clothoid curve and a line passing through node points corresponding to a corner area are relatively moved distance L m.

Subsequently, the control apparatus for predicting road shape 22 stores and sets "10000" in a memory area "bk-del-x" in which an X-coordinate error rate is stored and operates a second loop to sequentially search 100 points on the target clothoid curve for fitting. In case that each point on the clothoid curve has number "c-num", the second loop is executed from "c-num=0" to "99".

The control apparatus for predicting road shape 22 calculates an absolute value "del-x" of a difference between an X-coordinate at a target node point for fitting and an X-coordinate at a point "c-num" on the clothoid curve. Then the control apparatus for predicting road shape 22 determines whether the absolute value "del-x" is smaller than the X-coordinate error rate which is set in the memory area "bk-del-x". If the absolute value "del-x" is not smaller, a second loop is operated for the next point on the clothoid curve. If the absolute value "del-x" is smaller, the X-coordinate error rate set in the memory area "bk-del-x" is changed to the absolute value "del-x' and updated.

The control apparatus for predicting road shape 22 calculates an absolute value "del-y" of a difference between a Y-coordinate at the target node point for fitting and Y-coordinate at the point "c-num" on the clothoid curve. Then the control apparatus for predicting road shape 22 adds the X-coordinate error rate which is set in the memory area k-del-x to the absolute value "del-y" and sets the result as "work-dist". Further, the control apparatus for predicting road shape 22 determines whether the result "work-dist" is smaller than the fitting error rate which is-set in the memory area "low-dist". If the result "work-dist" is not smaller, a second loop is operated for the next point on the clothoid curve. If the result "work-dist" is smaller, the fitting error rate which is set in the memory area "low-dist" is changed to the result "work-dist" and updated. Then the control apparatus for predicting road shape 22 stores and sets a distance L, generated by the procedure for calculating node point coordinates, in the memory area "save-dist" in which the fitting result is stored. Then the second loop is operated for the next point on the clothoid curve.

The control apparatus for predicting road shape 22 executes the second loop from c-num=0 to 99, and after the second loop is terminated, the first loop is initiated from a point at which L is changed to a next value. Then the control apparatus for predicting road shape 22 executes the first loop from distance L=−100 to 100 m, and after the first loop is terminated, it is determined whether a value in the memory area "save-dist" in which the fitting result is stored is a default value, 10000. If the value in the memory area "save-dist" is not the default value, it is determined the fitting is successful and the fitting is terminated. If the value in the memory area "save-dist" is the default value, it is determined the fitting is unsuccessful and the fitting is terminated.

The fitting procedure shown in flowcharts of FIGS. 18 and 19 have the following steps.

Step S4-1—Stores and sets "100000" in a memory area "low-dist".

Step S4-2—Stores and sets "10000" in a memory area "save-dist".

Step S4-3—Operates a first loop from distance L=−100 m to 100 m.

Step S4-4—Executes a procedure for calculating node point coordinates.

Step S4-5—Stores and sets "10000" in a memory area "bk-del-x".

Step S4-6—Operates a second loop from point number "c-num=0" to "9" on a clothoid curve.

Step S4-7—Calculates an absolute value "del-x" of a difference between an X-coordinate at a target node point for fitting and an X-coordinate at a point "c-num" on the clothoid curve.

Step S4-8—Determines whether the absolute value "del-x" is smaller than an X-coordinate error rate which is set in the memory area "bk-del-x". If the absolute value "del-x" is smaller, the processing proceeds to Step 4-9. If not, the processing proceeds to Step S4-15.

Step S4-9—Changes the X-coordinate error rate which is set in the memory area "bk-del-x" to the absolute value "del-x" and updates.

Step S4-10—Calculates an absolute value "del-y" of a difference between a Y-coordinate at the target node point for fitting and a Y-coordinate at the point "c-num" on the clothoid curve.

Step S4-11—Adds the X-coordinate error rate which is set in the updated memory area "bk-del-x" to the absolute value "del-y" to obtain the result "work-dist".

Step S4-12—Determines whether the result "work-dist" is smaller than the fitting error rate which is set in the memory area "low-dist". If the result "work-dist" is smaller, the processing proceeds to Step 4-13. If not, the processing proceeds to Step S4-15.

Step S4-13—Changes the fitting error rate which is set in the memory area "low-dist" to the result "work-dist" and updates.

Step S4-14Stores and sets distance L m, generated by the procedure for calculating node point coordinates, in the memory area "save-dist"

Step S4-15—Terminates the second loop.

Step S4-16—Terminates the first loop.

Step S4-17—Determines whether a value stored in the memory area "save-dist" is identical to "10000". If the value stored in the memory area "save-dist" is different from "10000", the processing proceeds to Step S4-18. If the value stored in the memory area "save-dist" is identical to "10000", the processing proceeds to Step S4-19.

Step S4-18—Determines the fitting is successful and terminates the procedure.

Step S4-19—Determines the fitting is unsuccessful and terminates the procedure.

Figure 20:
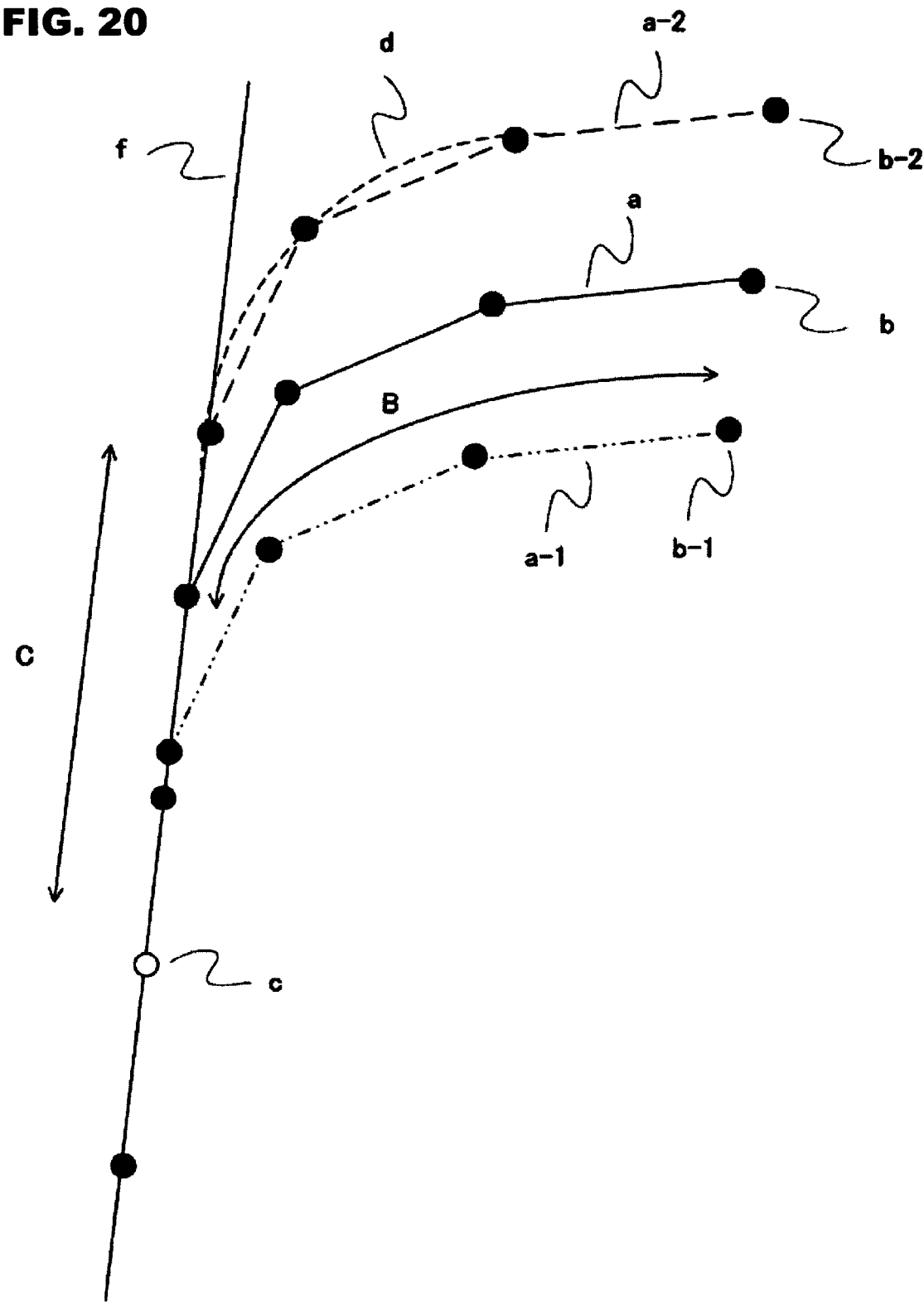
FIG. 20 is a diagram showing an exemplary operation of moving a target node point for fitting in the direction of a straight line which is connected with a corner.
Figure 21:
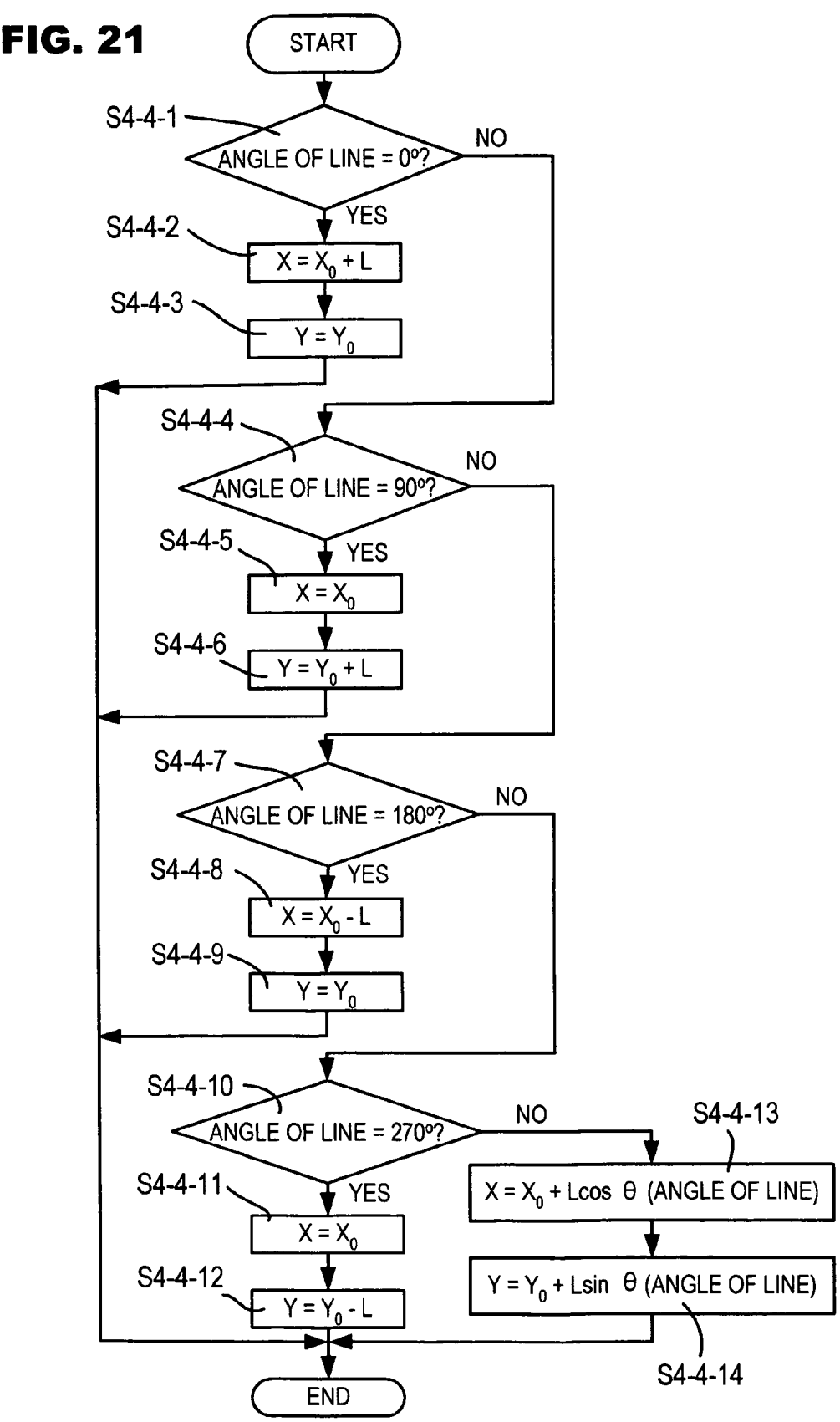
FIG. 21 is a flowchart showing an exemplary operation procedure for calculating node point coordinates.

Next, the procedure for calculating node point coordinates is described below. FIG. 20 is a diagram showing an exemplary operation of moving a target node point for fitting in the direction of a straight line which is connected with a corner. FIG. 21 is a flowchart showing an exemplary operation procedure for calculating node point coordinates.

According to the corner area B detected by the procedure for detecting the nearest corner area as shown in FIG. 20, the coordinates of the target nodes "b" for fitting, which are coordinates to be moved in the direction of a straight line which is connected with a corner, may be calculated. In FIG. 20, line "a" is a line passing through node points before being moved. Point "b" as ● is a node point before moved corresponding to the corner area B. Point "c" as ○ is a node point corresponding to a straight line area. Note that the corner area B detected by the procedure for detecting the nearest corner area may have four node points "b". Line "d" denotes a clothoid curve calculated by the procedure for calculating clothoid curve. Line "f" denotes a straight line which shows a direction of a straight line to the corner. "C" is an arrowhead which shows a migration direction of the node point "b". Lines "a-1" and "a-2" are lines passing through node points after being moved. Thus, an effect identical to the case according to the aspect which the clothoid curve is moved to the corner area B can be obtained.

The control apparatus for predicting road shape 22 determines whether an angle of the line "f" which shows a direction of a straight line to a corner area is 0 degrees. A direction of 0 degrees indicates that the line "f" faces east and the value of the angle increases in counterclockwise rotation. If the angle is 0 degrees, which indicates that the line "f" faces east, distance L m is added to the X-coordinate at the node point If the X-coordinate at the node point "b" before being moved is $X_0$, $X_0+L$ is set as the X-coordinate. If the Y-coordinate at the node point "b" before moved is $Y_0$, $Y_0$ is set as the Y-coordinate. Then the procedure for calculating node point coordinates is terminated.

If the angle of the line "f" is not 0 degrees, the control apparatus for predicting road shape 22 determines whether the angle of the line "f" is 90 degrees. An angle of 90 degrees indicates that the line "f" faces north. If the angle is 90 degrees, which indicates that the line "f" faces north, $X_0$ is set as the X-coordinate and $Y_0+L$ is set as the Y-coordinate. Then the procedure for calculating node point coordinates is terminated.

If the angle of the line "f" is not 90 degrees, the control apparatus for predicting road shape 22 determines whether the angle of the line "f" is 180 degrees. An angle of 180 degrees indicates that the line "f" faces west. If the angle is 180 degrees, which indicates that the line "f" faces west, $X_0-L$ is set as the X-coordinate and $Y_0$ is set as the Y-coordinate. Then the procedure for calculating node point coordinates is terminated.

If the angle of the line "f" is not 180 degrees, the control apparatus for predicting road shape 22 determines whether the angle of the line "f" is 270 degrees. An angle of 270 degrees indicates that the line "f" faces south. If the angle is 270 degrees, which indicates that the line "f" faces south, $X_0$ is set as the X-coordinate and $Y_0-L$ is set as the Y-coordinate. Then the procedure for calculating node point coordinates is terminated.

If the angle of the line "f" is not 270 degrees, that is, if the line "f" does not face to any of north, south, west, and east, distance L m is resolved into an X component and Y component and each component is added to X-Y coordinates at the node point For example, if the angle of the line "f" is $\theta$, $X_0+L\cos\theta$ is set as the X-coordinate and $Y_0+L\sin\theta$ is set as the Y-coordinate. Then the procedure for calculating node point coordinates is terminated.

The steps in the flowchart of FIG. 21 are described below.

Step S4-4-1—Determines whether an angle of a line "f" is 0 degree. If the angle of the line "f" is 0 degree, the processing proceeds to Step S4-4-2. If not, the processing proceeds to Step S4-4-4.

Step S4-4-2—Sets $X_0+L$ as a value X of the X-coordinate.

Step S4-4-3—Sets $Y_0$ as a value Y of the Y-coordinate and the proceeding is terminated.

Step S4-4-4—Determines whether an angle of the line "f" is 90 degrees. If the angle of the line "f" is 90 degrees, the processing proceeds to Step S4-4-5. If not, the processing proceeds to Step S4-4-7.

Step S4-4-5—Sets $X_0$ as a value X of the X-coordinate.

Step S4-4-6—Sets $Y_0+L$ as a value Y of the Y-coordinate and the procedure is terminated.

Step S4-4-7—Determines whether an angle of the line "f" is 180 degrees. If the angle of the line "f"]is 180 degrees, the processing proceeds to Step S4-4-8. If not, the processing proceeds to Step S4-4-10.

Step S4-4-8—Sets $X_0-L$ as a value X of the X-coordinate.

Step S4-4-9—Sets $Y_0$ as a value Y of the Y-coordinate and the procedure is terminated.

Step S4-4-10—Determines whether an angle of the line "f" is 270 degrees. If the angle of the line "f" is 270 degrees, the processing proceeds to Step S4-4-11. If not, the processing proceeds to Step S4-4-13.

Step S4-4-11—Sets $X_0$ as a value X of the X-coordinate.

Step S4-4-12—Sets $Y_0$–L as a value Y of the Y-coordinate and the procedure is terminated.

Step S4-4-13—Sets $X_0$+L cos as a value X of the X-coordinate.

Step S4-4-14—Sets $Y_0$+L sin as a value Y of the Y-coordinate and the procedure is terminated.

Figure 22:
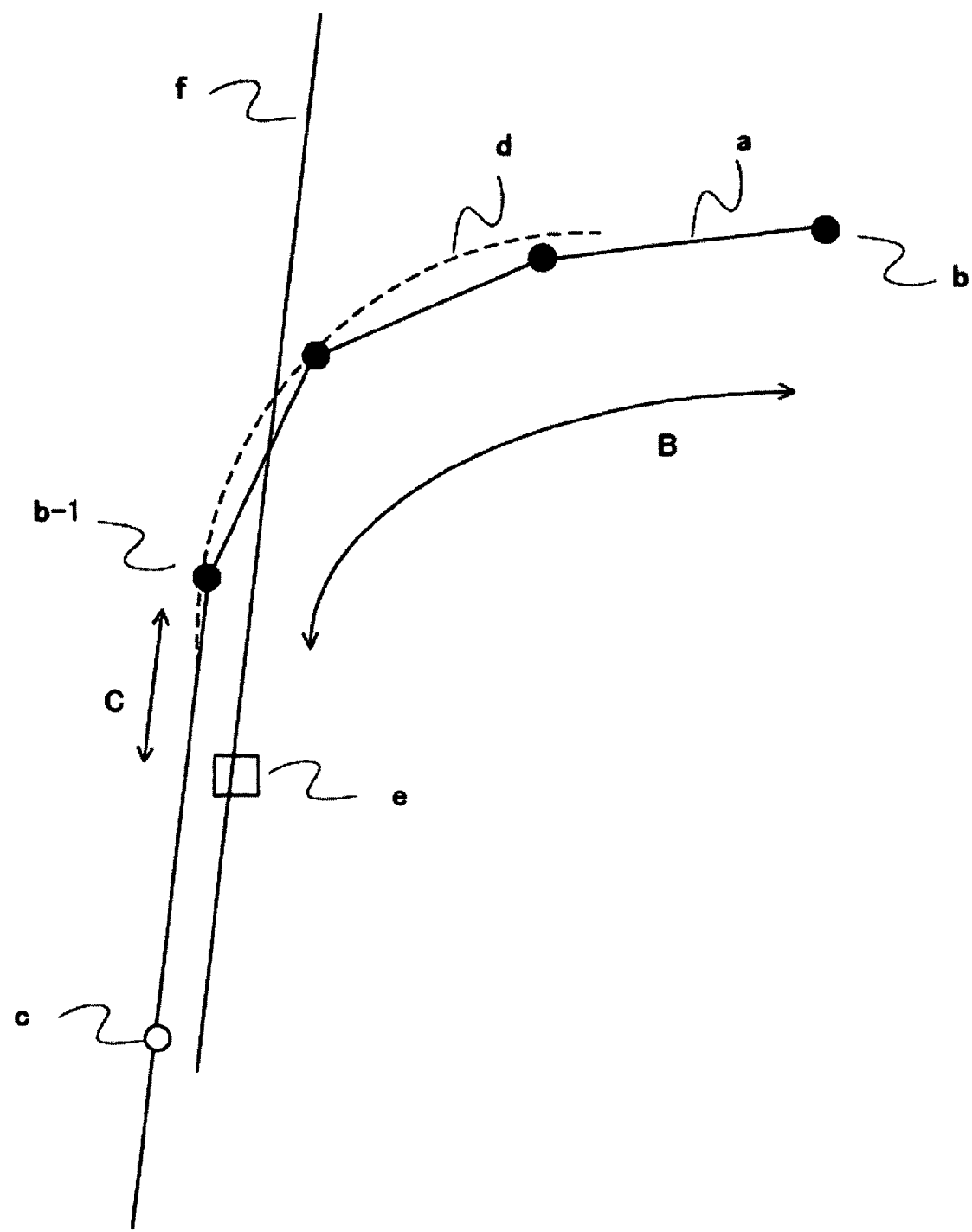
FIG. 22 is a diagram showing an exemplary operation of moving a start point of a clothoid curve in the direction of a straight line which is connected with a corner area.
Figure 23:
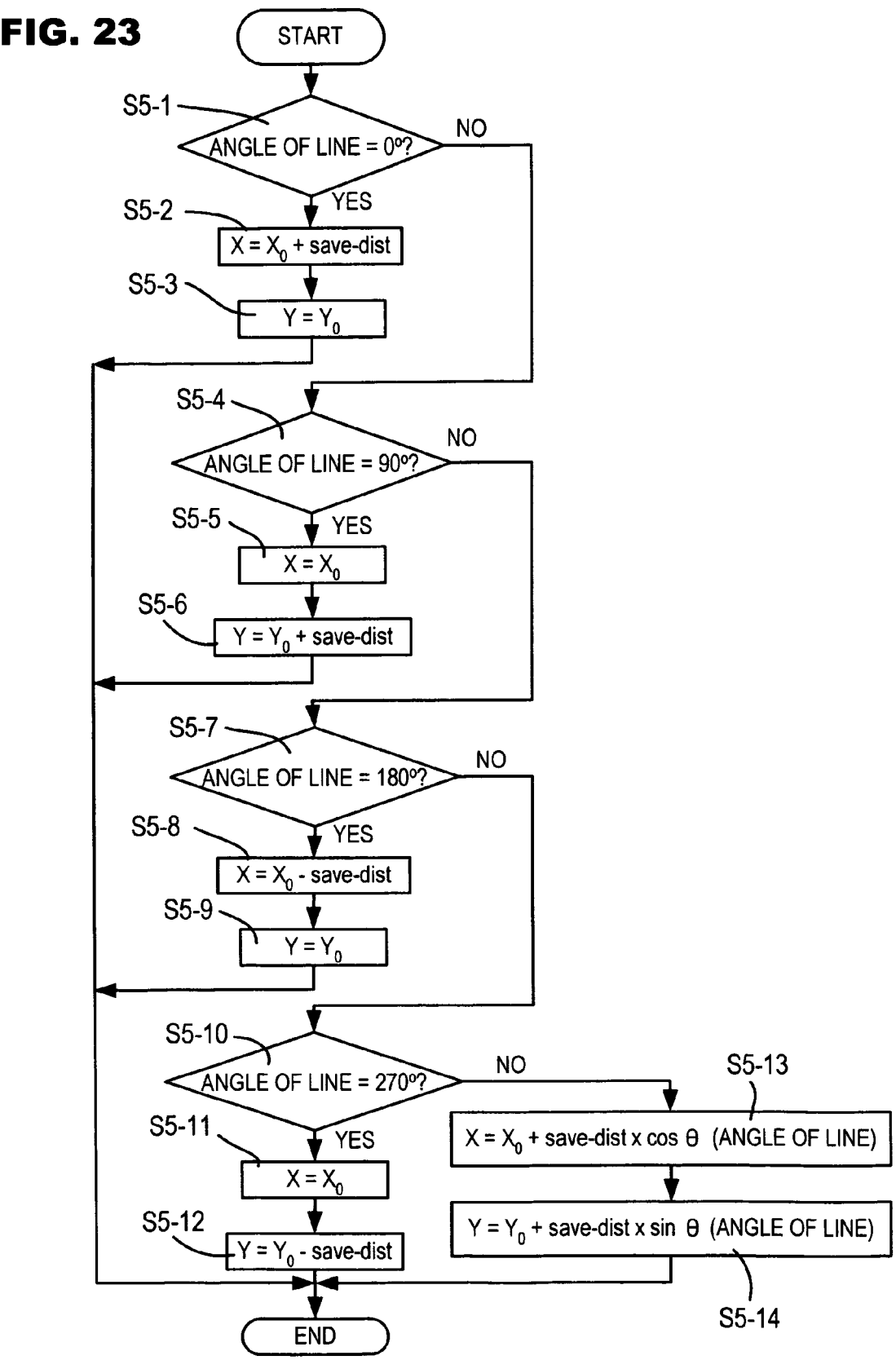
FIG. 23 is a flowchart showing an exemplary operation procedure for detecting start point position.

Next, a procedure for detecting a start point position is described below. FIG. 22 is a diagram showing an exemplary operation of moving a start point of a clothoid curve in the direction of a straight line which is connected with a corner area. FIG. 23 is a flowchart showing an exemplary operation procedure for detecting start point position.

As shown in in FIG. 22, a start point of a clothoid curve is moved distance L m in the direction of a straight line which is connected with a corner. The distance L is stored in the memory area "save-dist" as a fitting result obtained by a fitting. Note that line "f" in FIG. 22 is a line passing through node points. Point "b" as ● is a node point corresponding to the corner area B and point "c" as ○ is a node point corresponding to a straight line area. The corner area B that is detected by the procedure for detecting the nearest corner area may have four node points "b". Line "d" is a clothoid curve which is calculated by the procedure for calculating a clothoid curve. Line "f" denotes a straight line which shows a direction of a straight line to the corner. "C" is an arrowhead which shows a migration direction of the start point. Point "b-1" is a first node point in the corner area B and point "e" as □ indicates a position of a detected corner start point.

The control apparatus for predicting road shape 22 determines whether an angle of the line "f" which indicates a direction of a straight line to a corner area is 0 degree. The angle of the line "f" is found by same procedure with the procedure for calculating node point coordinates. If the angle is 0 degree, distance L m which is stored in the memory area "save-dist" is added to an X-coordinate at a node point "b-1". Note that 0 degree indicates that the line "f" faces to east. If the X-coordinate at the node point "b-1" is $X_0$, $X0$+L is set as a value X of an X-coordinate at a start point "e". If the Y-coordinate at the node point "b-1" is $Y_0$, $Y0$ is set as a value Y of the Y-coordinate at the start point "e". Then the procedure for detecting a start point position is terminated.

If the angle of the line "f" is not 0 degree, the control apparatus for predicting road shape 22 determines whether the angle of the line "f" is 90 degrees. If the angle is 90 degrees, which indicates that the line "f" faces to north, $X_0$ is set as a value X of the X-coordinate at the start point Then distance L m which is stored in the memory area "save-dist" is added to the Y-coordinate at the node point "b-1", $Y_0$+L is set as a value Y of the Y-coordinate at the start point "e" and the procedure for detecting a start point position is terminated.

If the angle of the line "f" is not 90 degrees, the control apparatus for predicting road shape 22 determines whether the angle of the line "f" is 180 degrees. If the angle is 180 degrees, which indicates that the line "f" faces to west, distance L m which is stored in the memory area "save-dist" is subtracted from the X-coordinate at the node point "b-1" $X_0$–L is set as a value X of the X-coordinate at the start point "e". $Y_0$ is set as a value Y of the Y-coordinate at the start point "e". and the procedure for detecting a start point position is terminated.

If the angle of the line "f" is not 180 degrees, the control apparatus for predicting road shape 22 determines whether the angle of the line "f" is 270 degrees. If the angle is 270 degrees, which indicates that the line "f" faces to south, $X_0$ is set as a value X of the X-coordinate at the start point "e". Distance L m which is stored in the memory area "save-dist" is subtracted from the Y-coordinate at the node point "b-1". $Y_0$–L is set as a value Y of the Y-coordinate at the start point "e" and the procedure for detecting a start point position is terminated.

If the angle of the line "f" is not 270 degrees, that is, if the line "f" does not face to any of north, south, west, and east, distance L m which is stored in the memory area "save-dist" is resolved into an X component and Y component and each value is added to the X-Y coordinates at the node point "b-1" more specifically, if an angle of the straight line "f" is $X_0$+L cos θ is set as the X-coordinate at the start point "e" and $Y_0$+L sin θ is set as the Y-coordinate at the start point "e". Then the procedure for detecting a start point position is terminated.

The steps in the start point setting procedure of the flowchart in FIG. 23 are described below.

Step S5-1—Determines whether an angle of a line "f" is 0 degree. If the angle of the line "f" is 0 degree, the procedure proceeds to Step S5-2. If not, the processing proceeds to Step S5-4.

Step S5-2 Adds a value of an X-coordinate at a node point "b-1" to distance L m which is stored in the memory area "save-dist" and sets $X_0$+L as a value X of an X-coordinate at a start point "e".

Step S5-3—Sets $Y_0$ as a value Y of the Y-coordinate at the start point "e" and the procedure is terminated.

Step S5-4—Determines whether the angle of the line "f" is 90 degrees. If the angle of the line "f" is 90 degrees, the processing proceeds to Step S5-5. If not, the processing proceeds to Step S5-7.

Step S5-5—Sets $X_0$ as a value X of the X-coordinate at the start point "e".

Step S5-6—Adds a value of the Y-coordinate at the node point "b-1" to distance L m which is stored in the memory area "save-dist", sets $Y_0$+L as a value Y of the Y-coordinate at the start point "e" and the procedure is terminated.

Step S5-7—Determines whether the angle of the line "f" is 180 degrees. If the angle of the line "f" is 180 degrees, the processing proceeds to Step S5-8. If not, the processing proceeds to Step S5-10.

Step S5-8—Subtracts distance L m which is stored in the memory area "save-dist" from a value of the X-coordinate at the node point "b-1" and sets $X_0$–L as a value X of the X-coordinate at the start point "e".

Step S5-9—Sets $Y_0$ as a value Y of the Y-coordinate at the start point "e" and the procedure is terminated.

Step S5-10—Determines whether the angle of the line "f" is 270 degrees. If the angle of the line "f" is 270 degrees, the processing proceeds to Step S5-11. If not, the processing proceeds to Step S5-13.

Step S5-11—Sets $X_0$ as a value X of the X-coordinate at the start point "e".

Step S5-12—Subtracts distance L m which is stored in the memory area "save-dist" from a value of the Y-coordinate at the node point "b-1" and sets $Y_0$–L as a value Y of the Y-coordinate at the start point "e". Then the procedure is terminated.

Step S5-13—Resolves the distance L m stored in the memory area "save-dist" into value X and Y and adds each value to X-Y coordinates at the node point "b-1" more specifically, sets $X_0$+L cos θ as a value X of the X-coordinate at the start point "e".

Step S5-14—Sets $Y_0$+L sin θ as a value Y of the Y-coordinate at the start point "e" and the procedure is terminated.

As described hitherto, the apparatus for predicting road shape 20 executes the procedure for predicting road shape, detects a corner area based on map data which is stored in the map database 21a, and calculates a clothoid curve corresponding to a start part of the corner area based on the minimum radius of the corner area. Further the apparatus for predicting road shape 20 fits the clothoid curve with a line passing through node points corresponding to the corner area and detects the start point position of the corner area based on the fitting result. Note that it is described in the aforementioned procedure for predicting road shape that the clothoid curve corresponding to the start part of the corner area may be calculated and the start point position may be detected. In case that same procedure is executed in the reverse direction, a clothoid curve corresponding to an end part of the corner area can be calculated and an end point position can be determined.

Therefore, a start point and end point of a corner area may be set even at a position other than node points in node data which are stored in the map database 21a. Thus, even if there are wide intervals between node points, it is possible to accurately recognize the start and end point of the corner area. Further clothoid curves are set in the start part and end part of the corner area so that it is possible to accurately recognize change of curvature in the start part and end part of the corner area and even to make the change of curvature smooth. Additionally, it is possible to set a smooth curve between a node point and an adjoining node point in the corner area so that road shape of the corner area can be recognized accurately. Thus road shape including corners may be predicted accurately.

The minimum radius of the corner area is used for calculating the clothoid curve so that the radius of the corner area may be recognized accurately. Further, a clothoid coefficient of the clothoid curve is obtained from a radius-clothoid coefficient table which is produced in advance and shows a relation between radius and clothoid coefficient, so that the accurate clothoid curve may be readily calculated in a short time period.

Further the radius-clothoid coefficient table is based on a road design map and produced by statistically analyzing in advance a relation between a radius of a corner area for an actual road and a clothoid coefficient of a clothoid curve which is used at design of the road. Therefore the radius-clothoid coefficient table is reliable and has widespread applicable data. Further approximate expressions are used for calculating a clothoid curve so that loads against the calculation procedure can be reduced and it is possible to readily calculate a high-precision clothoid curve even in a short time period.

Additionally, the calculated clothoid curve is fitted to a line passing through node points corresponding to the corner area. Thus the clothoid curve may be readily and accurately applied and a start point and end point of the corner area may be accurately set as well. Further when fitted, the clothoid curve is moved along with a straight line which is connected with the corner so that the start point and end point of the corner area may be accurately set on the straight line.

The predicted result database 25 records and accumulates data which is obtained from the procedure for predicting road shape so that it is not necessary to repeatedly execute the procedure for predicting road shape for one road.

As described hitherto, road shape including corners may be accurately and readily predicted. Therefore positions of a start point and end point of a corner area may be accurately calculated and further change of curvature in a start part and end part of the corner area may be obtained accurately. Thus applicable corner control may be executed smoothly.

While various features of this invention have been described in conjunction with the exemplary embodiment outlined above, various alternatives, modifications, variations and/or improvements of those features may be possible. Accordingly, the exemplary embodiment of the invention, as set forth above, is intended to be illustrative. Various changes may be made without departing from the spirit and scope of the invention.

The invention claimed is:

1. An apparatus for predicting road shape, comprising:
   a map data reading unit for reading map data;
   a clothoid curve calculating unit for calculating a clothoid curve corresponding to a corner area based on said map data; and
   a fitting unit for adjusting said clothoid curve to said corner area; and
   wherein the clothoid curve calculating unit obtains a clothoid coefficient corresponding to the minimum radius of said corner area from a table which is produced based on a relation between a radius of said corner area on an actual road and a clothoid coefficient of a clothoid curve.

2. The apparatus for predicting road shape according to claim 1 further comprising:
   a start point position detecting unit for detecting a position of a start point or end point of said corner area based on said clothoid curve adjusted to said corner area.

3. The apparatus for predicting road shape according to claim 1, wherein the fitting unit adjusts said clothoid curve to a start part or end part of said corner area.

4. The apparatus for predicting road shape according to claim 2, wherein the fitting unit adjusts said clothoid curve to a start part or end part of said corner area.

5. The apparatus for predicting road shape according to claim 1, wherein the clothoid curve calculating unit calculates a clothoid curve by using X-coordinates and Y-coordinates which are found by the following approximate expressions (1) and (2):

$$X = X_0 + \sum_L \cos\phi \tag{1}$$

$$Y = Y_0 + \sum_L \cos\phi \tag{2}$$

wherein $X_0$ and $Y_0$ are X-Y coordinates at a start point of a clothoid curve, L is a distance from the start point of the clothoid curve, $\phi$ is computed by the following equation (3):

$$\phi = \alpha + 2kL \tag{3}$$

wherein $\alpha$ is an angle for the start point of the clothoid curve and "k" is computed by the following equation (4):

$$k = \frac{28}{A^2} \tag{4}$$

wherein A is a clothoid coefficient.

6. The apparatus for predicting road shape according to claim 1 further comprising:
   a predicted result database for storing data obtained by each operation of the clothoid curve calculating unit, fitting unit, and start point position detecting unit.

7. An apparatus for predicting road shape, comprising:
   a map data reading unit for reading map data;
   a clothoid curve calculating unit for calculating a clothoid curve corresponding to a corner area based on said map data; and a fitting unit for adjusting said clothoid curve to said corner area; and wherein the clothoid curve calculating unit calculates a clothoid curve by using X-coordinates and Y-coordinates which are found by the following approximate expressions (1) and (2):

$$X = X_0 + \sum_L \cos\phi \quad (1)$$

$$Y = Y_0 + \sum_L \cos\phi \quad (2)$$

wherein $X_0$ and $Y_0$ are X-Y coordinates at a start point of a clothoid curve, L is a distance from the start point of the clothoid curve, $\phi$ is computed by the following equation (3):

$$\phi = \alpha + 2kL \quad (3)$$

wherein $\alpha$ is an angle for the start point of the clothoid curve and "k" is computed by the following equation (4):

$$k = 28/A^2 \quad (4)$$

wherein A is a clothoid coefficient.

8. The apparatus for predicting road shape according to claim 7 further comprising:
a predicted result database for storing data obtained by each operation of the clothoid curve calculating unit, fitting unit, and start point position detecting unit.

9. The apparatus for predicting road shape according to claim 7 further comprising:
a start point position detecting unit for detecting a position of a start point or end point of said corner area based on said clothoid curve adjusted to said corner area.

10. The apparatus for predicting road shape according to claim 7, wherein the fitting unit adjusts said clothoid curve to a start part or end part of said corner area.

11. A method of calculating a clothoid curve comprising:
(a) calculating a clothoid curve corresponding to a corner area based on map data using a program controlled computer; and
calculating the clothoid curve using X-coordinates and Y-coordinates which are found by the following approximate expressions (1) and (2):

$$X = X_0 + \sum_L \cos\phi \quad (1)$$

$$Y = Y_0 + \sum_L \cos\phi \quad (2)$$

wherein $X_0$ and $Y_0$ are X-Y coordinates at a start point of a clothoid curve, L is a distance from the start point of the clothoid curve, $\phi$ is computed by the following equation (3):

$$\phi = \alpha + 2kL \quad (3)$$

wherein $\alpha$ is an angle for the start point of the clothoid curve and "k" is computed by the following equation (4):

$$k = \frac{28}{A^2} \quad (4)$$

wherein A is a clothoid coefficient.

* * * * *